United States Patent
Yoshioka et al.

(10) Patent No.: US 10,743,107 B1
(45) Date of Patent: Aug. 11, 2020

(54) SYNCHRONIZATION OF AUDIO SIGNALS FROM DISTRIBUTED DEVICES

(71) Applicant: Microsoft Technology Licensing, LLC, Redmond, WA (US)

(72) Inventors: Takuya Yoshioka, Bellevue, WA (US); Andreas Stolcke, Berkeley, CA (US); Zhuo Chen, Woodinville, WA (US); Dimitrios Basile Dimitriadis, Bellevue, WA (US); Nanshan Zeng, Bellevue, WA (US); Lijuan Qin, Redmond, WA (US); William Isaac Hinthorn, Seattle, WA (US); Xuedong Huang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/399,369

(22) Filed: Apr. 30, 2019

(51) Int. Cl.
| | |
|---|---|
| H04R 5/04 | (2006.01) |
| G10L 15/16 | (2006.01) |
| H04L 29/06 | (2006.01) |
| H04R 3/04 | (2006.01) |
| H04R 3/12 | (2006.01) |
| G10L 15/08 | (2006.01) |

(52) U.S. Cl.
CPC ............... *H04R 5/04* (2013.01); *G10L 15/16* (2013.01); *H04L 65/60* (2013.01); *H04R 3/04* (2013.01); *H04R 3/12* (2013.01); *G10L 2015/088* (2013.01); *H04R 2420/07* (2013.01)

(58) Field of Classification Search
CPC ....... G10L 19/008; G10L 25/06; G10L 15/16; G10L 2015/088; H04S 7/30; H04M 3/568; H04R 5/04; H04R 3/04; H04R 3/12; H04R 2420/07; H04L 65/60
See application file for complete search history.

(56) References Cited

U.S. PATENT DOCUMENTS

| | | | |
|---|---|---|---|
| 2012/0170760 A1* | 7/2012 | Virolainen | G10L 19/008 381/56 |
| 2013/0022189 A1* | 1/2013 | Ganong, III | G10L 15/00 379/202.01 |
| 2017/0150255 A1* | 5/2017 | Wang | G04G 21/06 |

\* cited by examiner

*Primary Examiner* — Mark Fischer
(74) *Attorney, Agent, or Firm* — Schwegman Lundberg & Woessner, P.A.

(57) ABSTRACT

A computer implemented method includes receiving audio signals representative of speech via multiple audio channels transmitted from corresponding multiple distributed devices, designating one of the audio channels as a reference channel, and for each of the remaining audio channels, determine a difference in time from the reference channel, and correcting each remaining audio channel by compensating for the corresponding difference in time from the reference channel.

20 Claims, 15 Drawing Sheets

SYNCHRONIZATION OF AUDIO SIGNALS FROM DISTRIBUTED DEVICES

BACKGROUND

Meetings that are planned in advance may make use of one or more conferencing tools that are set up in advance of the meeting or at the start of a meeting to record the conversation and generate a speaker attributed transcript. Such existing conferencing tools may include a device having plurality of fixed speakers on different sides of the device that sits on a conference table. The device may have a tower- or cone-like shape and may have a video camera that can be used to identify and track people in the meeting. Speech to text algorithms may be used to create the transcript. Audio beamforming may be used in conjunction with the known locations of the fixed speakers along with video of attendees to attribute speech in the transcript.

SUMMARY

A computer implemented method includes receiving audio signals representative of speech via multiple audio channels transmitted from corresponding multiple distributed devices, designating one of the audio channels as a reference channel, and for each of the remaining audio channels, determine a difference in time from the reference channel, and correcting each remaining audio channel by compensating for the corresponding difference in time from the reference channel.

DETAILED DESCRIPTION

Figure 1:
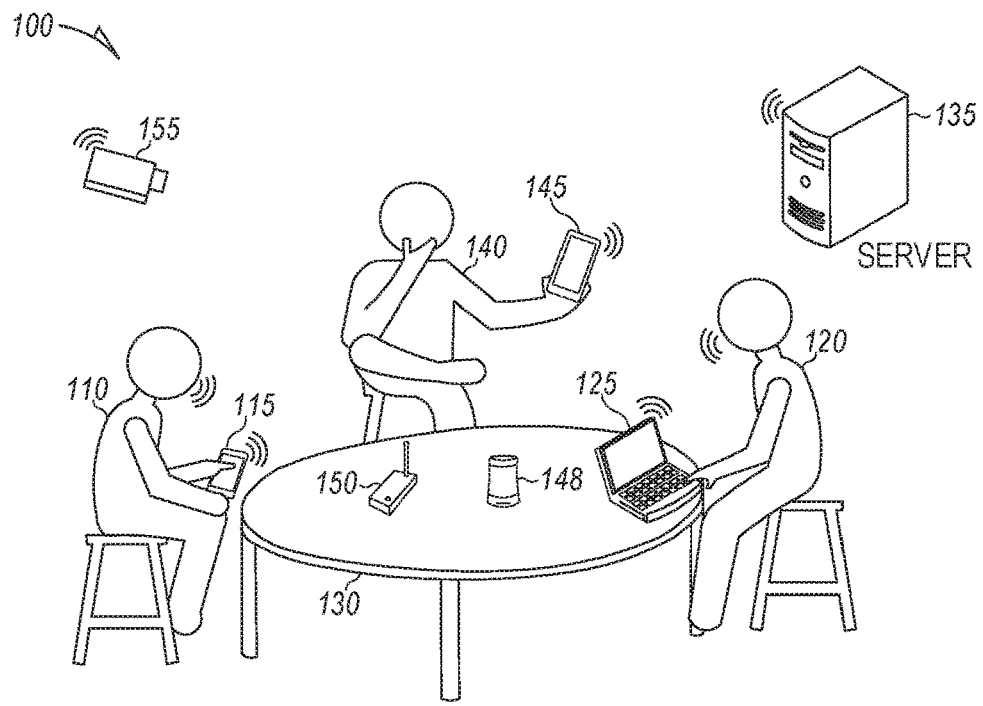
FIG. 1 is a perspective view of a meeting between multiple users according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical, and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Individuals, referred to as users, can start a conversation or meeting at any time. If a meeting had been scheduled, arrangements could have been made to record the conversation and create a transcript of the conversation for later reference. However, ad-hoc meetings don't generally involve such preparation. Stopping the meeting, or otherwise devoting time to set up a method to record the conversation and arrange for a transcript to be created may be distracting or may not be thought of during the meeting. In addition, the ad-hoc meetings often take place outside conference rooms. In this case, recording devices specifically designed for meetings are not available.

During the conversation, the audio of the conversation may be captured by devices the users may be carrying, referred to as distributed devices. The captured audio signals may be transmitted to a meeting system over wireless channels to recognize that multiple users are having a conversation, referred to as a meeting, which may or may not have been planned. If the meeting was unplanned, it may be referred to as an ad-hoc meeting.

In response to a meeting having been detected or otherwise arranged, a meeting instance is generated on the meeting system to recognize speech from users that may be speaking and to generate a transcript of the meeting. Multiple signals of speech from multiple distributed devices may be received as separate audio channels and used to generate the transcript. Distributed devices may include personal user devices as well as other devices including digital assistants, cameras, and any type of device that is capable of receiving audio and/or video that may be within range of the conversation.

In some embodiments, a meeting can be created with a single press of a button on a single device via the meeting app. Other devices and users with devices can join the meeting either through the press of a button presented on the user device via the meeting app, or by being recruited while not in use (e.g. an existing conferencing device that is present in the room). Meeting participants may be inferred by voice fingerprint, owners of participating devices, facial recognition, and by manually adding a user via a meeting application on their device at any point. (e.g. for remote participants).

There are many different ways that a meeting may be established. The distributed devices, such as smart phones, may be associated with respective users and may include a meeting application used to stream audio and/or video received from a microphone and/or camera on the device to the meeting server. The audio received from nearby devices will have an audio signature based on a combination of ambient noise and/or any sound generated near the device. In response to two user devices providing a similar audio signature via their respective audio streams (audio channels), the meeting system recognizes that a meeting may be occurring and creates the meeting instance to process the audio received. Users may be prompted via their meeting applications to join the meeting, or other information, such as location information, prior interactions, calendar information, or recent email interactions for example, may be used to confirm that both users or yet a third user should be added to the meeting instance.

In further embodiments, an audio watermark may be generated by one or more of the user devices. The audio watermark may comprise the audio signature or may be separately detected. The audio watermark may be a sound pattern having a frequency above the normal hearing range of a user, such as 20 Khz or higher, or may just be a sound that is inconspicuous to users so as not to interfere with the conversation. In further embodiments, the watermark may be completely audible and recognizable. The watermark may be selected to be sent by a user desiring to ensure that a meeting instance is created during a conversation in some embodiments. The watermark will be received by distributed devices within range and automatically or optionally added to a meeting instance. Devices within range of the watermark sound may also have their audio streams added to the meeting instance as additional audio channels.

A conference code may be generated and sent to other users to add them to a planned or ad-hoc meeting. The conference code may also be selected ahead of a scheduled meeting and used in a meeting invitation. The meeting system, on receiving the conference code from a user device will add the audio stream from such user device to the meeting once instantiated. In further embodiments, multiple clusters of distributed devices may be joined using the conference code. The clusters may be in different locations, such as different halls, rooms, cities, countries, etc.

In one embodiment, output may be customized based on a user preference in a distributed system are provided. In example embodiments, the meeting server or system receives audio streams from a plurality of distributed devices involved in an intelligent meeting. An intelligent meeting is simply a meeting where one or more devices are used to capture speech and create a transcript, which may have speaker attribution. The meeting system identifies a user corresponding to a distributed device of the plurality of distributed devices and determines a preferred language of the user. A transcript from the received audio streams is generated as the meeting occurs. The meeting system translates the transcript into the preferred language of the user to form a translated transcript. The translated transcript is provided to the distributed device of the user. In example embodiments, the translated transcript is provided in real-time (or near real-time) as the meeting is occurring. The translated transcript can be provided via text (e.g., displayed on a device of the user) or outputted as audio (e.g., via a speaker, hearing aid, earpiece). In some embodiments, instead of or in addition to translation, other types of transformation may be applied to the original transcript, translated transcript, or translated speech audio.

FIG. 1 is a perspective view of a meeting 100 between multiple users. A first user 110 has a first device 115 that includes a microphone to capture audio, including speech. A second user 120 has a second device 125 that is also capable of capturing audio, including speech. The users may be seated at a table 130 in one example meeting 100.

The first and second devices 115 and 125 transmit the captured audio to a meeting server 135 for processing and generation of a transcript. The meeting may be ad-hoc, in that it was unplanned. The users may have run into each other on a break or happened to meet each other in a hallway and decided to talk about a project they are working on. A meeting application, or meeting app may be running on both the first and second devices. The meeting app may be used to provide the audio to the meeting server 135.

The meeting server 135 may detect that both devices are sending audio with a similar audio signature, an audio watermark, a meeting code provided by both devices, or other information indicative of an ongoing discussion between the users. The meeting server 135 may generate a meeting instance to process the received audio and generate a transcript.

In various embodiments, a watermark may be any type of sound having energies only above the human auditory range, which is about 20 kHz. or is otherwise inaudible, inconspicuous, or non-distracting that identifies a meeting instance or meeting code corresponding meeting 100. The watermark may be a sound encoding the meeting code or other identification of the meeting instance in further embodiments.

Meeting 100 may involve more than two people, whether planned or ad-hoc. A third user 140 with a third device 145 may also join in the meeting 100. The third device 145 may also provide audio to the distributed meeting server 135. The audio may be recognized as involved in the meeting 100 by one or more of the same mechanisms described for recognizing that the first two users/devices were involved in the meeting 100.

An owner/user of a distributed device may enroll himself/herself via the app to be recognized by the meeting server 135. The user may already have a voice profile, referred to as a voice thumbprint or fingerprint, to help the meeting server 135 associate an incoming speech sound with the user. If a random person joins the meeting 100, the meeting server may recognize that the person is not known, and prompt one or more of the users already in a meeting for the person's name, or may also search a database in an organization associated with known users in the meeting to match the person with a profile. If the person is not known or otherwise identified, the person may be identified with a label or tag as speaker 1, speaker 2, etc. in a generated transcript, making it easier to modify the transcript if the person is later named. Any of the users may assign a name to the speaker labels at any time during or after the meeting. Known contacts of those already in the meeting may be used to reduce the pool/database used to initially check for the person to optimize the process of identifying the person.

There may be additional devices that are within audio or visual range of the meeting 100, such as a digital assistant 148 or a dedicated meeting device 150, both of which are shown on table 130, but could be anywhere within audio range of the meeting 100. Such additional devices may also be connected to the distributed meeting server 135 and have their audio streams added to the meeting instance for processing to further enhance the audio and speech to text processing capabilities of the meeting instance running on meeting server 135. Such additional devices may be detected by the server and added to the meeting as described above or may be presented to one or more of the users as an option to add to the meeting.

A video camera 155 or other camera may have a field of view that encompasses the meeting 100. The meeting server 135 may be aware of such cameras being near the meeting 100 and may provide an indication to one or more of the users, providing an option to obtain information from the cameras to the meeting instance to further enhance the processing and provision of a transcript. For instance, such cameras may be used to detect which user is speaking, or at least provide information that a user is likely to be speaking at any particular point in time.

Figure 2:
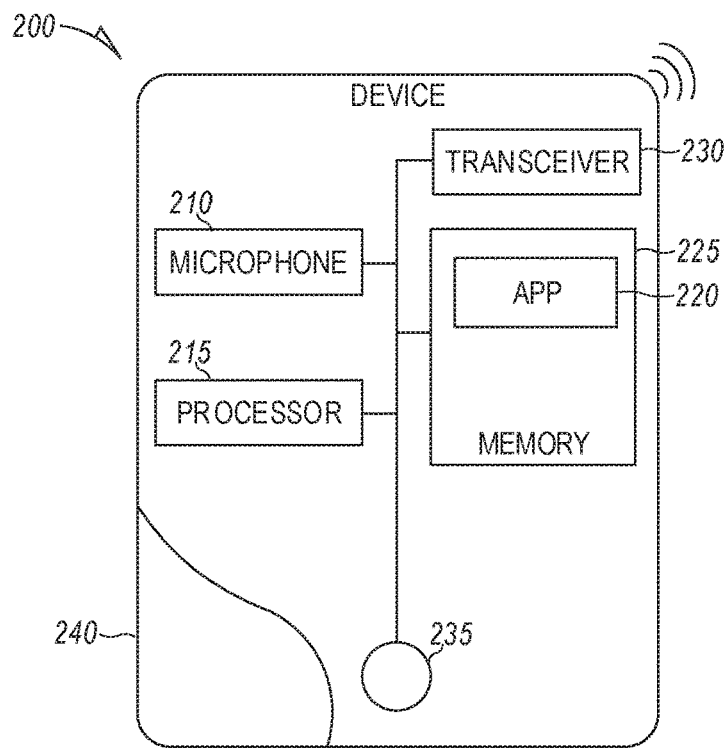
FIG. 2 is a block diagram of a user device for use in meetings according to an example embodiment.

FIG. 2 is a block diagram of a user device 200 for use in meetings. Other devices that may participate in the meeting may have a similar set of components. Device 200 includes at least one microphone 210 and a processor 215 for executing a meeting app 220 that is stored on memory 225. A transceiver 230 is used for streaming audio and/or video from a camera 235 to the distributed meeting server 135. User device 200 may also have a display screen, such as a touch screen 240, a portion of which is shown.

Devices that may be participating in the meeting can be identified via calendar entries, current location, NFC (after bringing phones very close together), Bluetooth® advertising, and direct invitation via the conference code or other code that may be generated and associated with the meeting 100.

The meeting server 135 may be processing several meetings at the same time via multiple meeting instances. Each meeting instance may include a meeting identifier, such as the meeting code, identifications of devices that are streaming audio, identifications of users that are participating in the meeting, either via a user associated device, or otherwise recognized by the meeting server by facial recognition, voice recognition, or other means of recognizing users.

Figure 3:
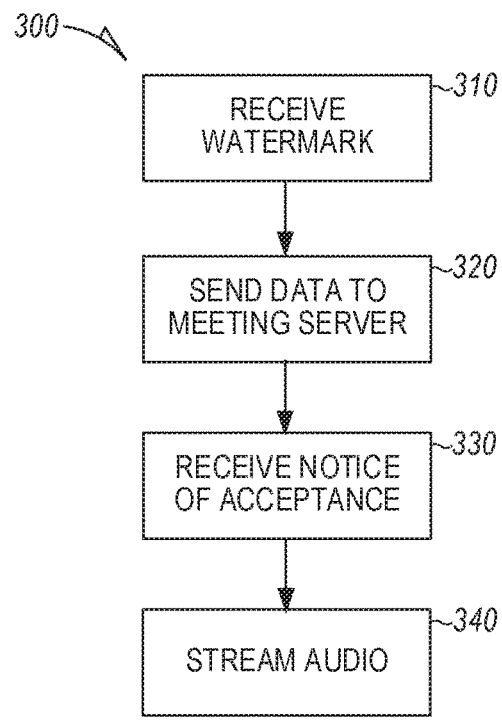
FIG. 3 is a flowchart illustrating a method of initiating an intelligent meeting between two users with associated distributed devices according to an example embodiment.

FIG. 3 is a flowchart illustrating a method 300 of initiating an intelligent meeting between two users with associated distributed devices. At operation 310 an audio watermark is received at a first distributed device via a microphone associated with the first distributed device. The audio watermark may be transmitted by a speaker associated with a second distributed device during a meeting. Data corresponding to the received audio watermark is transmitted via the first distributed device to a distributed device meeting server at operation 320. Note that the received audio watermark may first be converted to digital form, which may be simply a direct conversion of the audio watermark into a digital representation of the sound or may include a decoding of the audio watermark to obtain data identifying a meeting or the second distributed device that emitted the audio watermark. An indication may be received from the distributed meeting server at operation 330 that the first distributed device has been accepted to a meeting instance on the distributed device meeting server. The first distributed device at operation 340 streams audio of the meeting to the meeting instance on the distributed device meeting server in response to the received indication. The received indication may include information identifying a communication channel to use, or the audio stream may simply identify the streaming device which the meeting server uses to direct the audio stream to the correct meeting instance.

Figure 4:
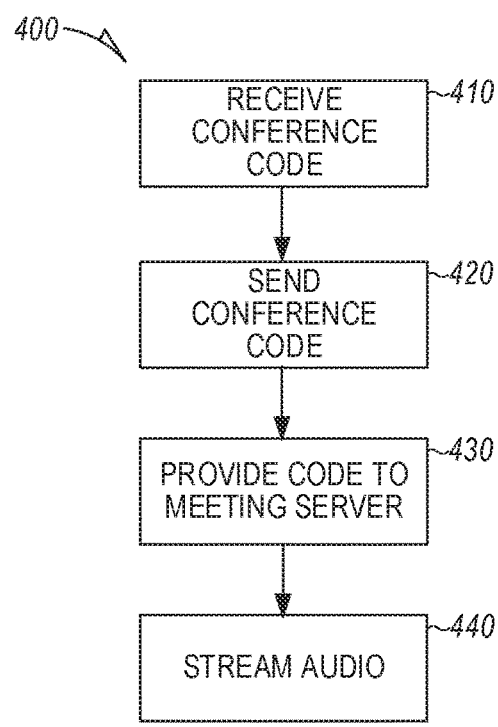
FIG. 4 is a flowchart illustrating a method of adding distributed devices to an intelligent meeting by the use of a conference code according to an example embodiment.

FIG. 4 is a flowchart illustrating a method 400 of adding distributed devices to an intelligent meeting using a conference code. In some embodiments, the conference code may be encoded in a watermark as in method 300. At operation 410, a conference code is generated for a meeting between users via a first distributed user device. The first distributed user device may receive the code from a meeting server executing a meeting instance or may generate the meeting code via a meeting app running on the first distributed user device. The code may be sent to a second distributed user device at operation 420. The code may be sent via email, text, or other means of sending data electronically, or may be encoded as an audible signal (audio watermark) and transmitted acoustically to the rest of the participating devices, such as via a speaker of one of the user devices, such as the first distributed user device. The second distributed user may provide the conference code to the meeting server meeting instance where the meeting code is used at operation 430 to identify at least one second distributed user device. The second distributed user device streams audio at operation 440 to the meeting server meeting instance from both the first and second distributed user devices.

The meeting may be an ad-hoc meeting between multiple users with multiple respective user devices and the conference code is generated after the ad-hoc meeting has started. Note that there may also be users without an associated user device that are participating in the meeting. Other user devices and devices not associated with a user may be identified based on the detected location of devices. Data from such devices may have their data streams added to the meeting instance by providing a list of other nearby devices to user(s) and allow selection of such devices via a user interface of the app to add to the meeting instance. Devices that may be participating in the meeting can be identified via calendar entries, current location, NFC (bring phones very close together), Bluetooth advertising, and direct invitation.

In further embodiments, the meeting is a planned meeting between multiple users with multiple respective user devices and the conference code is generated before the planned meeting has started. The conference code may be sent to each of the user devices and used by the corresponding apps to identify the devices to the meeting server meeting instance for adding data streams from such devices during the meeting.

Figure 5:
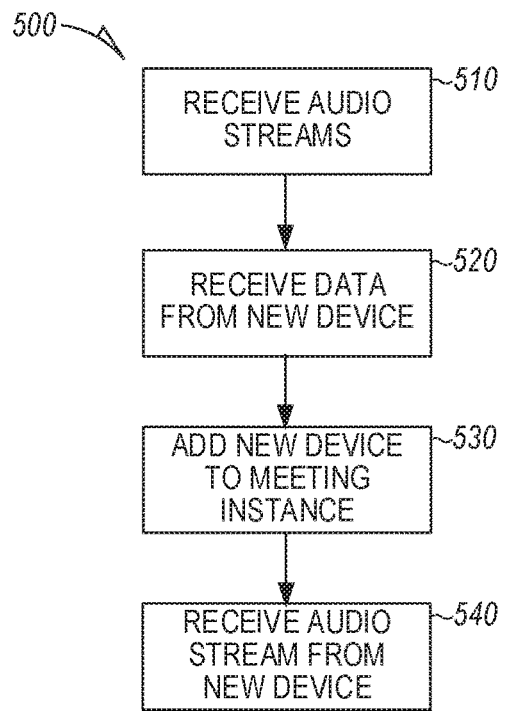
FIG. 5 is a computer implemented method of adding further devices to an intelligent meeting according to an example embodiment.

FIG. 5 is a computer implemented method 500 of adding further devices to an intelligent meeting. At operation 510 a meeting server receives audio streams from a group of distributed devices, wherein the audio streams comprise speech captured or detected by such group of distributed devices during a meeting of two or more users. The meeting server receives meeting information at operation 520, corresponding to the meeting, from an additional or new distributed device. The new device may be a user device where the user has just joined the meeting, or the new device may be a device that is in a room or otherwise within range of the intelligent meeting. At operation 530, the additional distributed device is added to the meeting server meeting instance. A stream of information from the additional distributed device is received at operation 540 in response to adding the additional distributed device.

Figure 6:
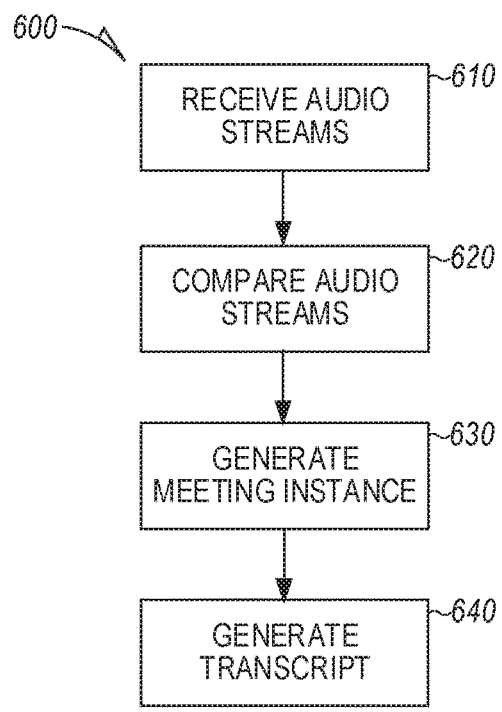
FIG. 6 is a flowchart illustrating a computer implemented method of detecting that an ad-hoc meeting is occurring according to an example embodiment.

FIG. 6 is a flowchart illustrating a computer implemented method 600 of detecting that an ad-hoc meeting is occurring. At operation 610, audio streams are received at a meeting server from two distributed devices that are streaming audio detected during an ad-hoc meeting between two users. The audio streams are compared at operation 620 to determine that the audio streams are representative of sound from the ad-hoc meeting. The meeting server generates a meeting instance at operation 630 to process the audio streams in response to determining that the audio streams are representative of sound from the ad-hoc meeting. At operation 640, the audio streams are processed to generate a transcript of the ad-hoc meeting.

The audio streams may be compared using many different algorithms for comparing two signals. In one embodiment, the comparison is performed by calculating the normalized cross correlation coefficients between two signals. If the results are above a selected threshold, the audio streams are mostly likely from the same (ad-hoc) meeting. The selected threshold may be a number between 0 and 1 and may be selected empirically based on tests conducted during a number of meeting scenarios in different environments. The selection may be performed to obtain a desired balance of false negatives and false positives. Other indications that the streams are from the same meeting include the location of the devices. Further indications include users that have had multiple contacts in the past, are in the same organization, and other indications that the users are likely to meet. Further verification can be obtained by comparing the text generated from the audio streams.

Once the streams are successfully compared, a meeting id(identifier)/code may be generated and used to add more participants. Other participants may be added in response to further devices streaming audio that is successfully compared to the audio streams already in the meeting. Once a device is added, the device may generate a signal indicative of joining the meeting, such as a ping.

Users may also be authenticated prior to audio streams from their respective devices being added to the meeting instance. Authentication may be based on user confirmation from app, calendar information, organization chart, use of the meeting code, extent of contact/relationship with users already in the meeting, and other means of authentication.

In one embodiment, the meeting server 135 detects when a device and/or an associated user has left the meeting and removes the audio stream/channel from the meeting instance. When a participant associated with a device leaves a meeting, the meeting server 135 detects the absence of the audio signal associated with other device in the meeting and removes the device from the meeting. Alternatives include the user signaling leaving via the meeting app, closing the meeting app, detecting that the location of the device is no longer near the location of the meeting, detecting the absence of the corresponding audio watermark in the video stream from a device, detecting that the audio signature received by a device no longer matches that of other device audio streams, and performing image recognition on images from video signals to detect that the user is leaving or has left a conference room or area where the meeting is taking place. Similarly, the meeting instance can be concluded in response to a single user remaining or single user device remaining.

Figure 7:
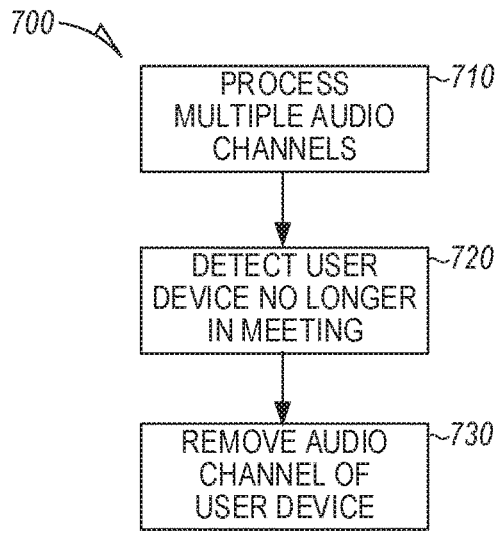
FIG. 7 is a flowchart illustrating a computer implemented method of removing audio channels from user devices and other devices in response to users leaving a meeting according to an example embodiment.

FIG. 7 is a flowchart illustrating a computer implemented method 700 of removing audio channels from user devices and other devices in response to users leaving a meeting. At operation 710, multiple audio signals received on corresponding multiple audio channels received from a group of distributed devices receiving audio from a distributed device meeting are processed by a meeting server instance. The meeting server instance is used at operation 720 to detect that a first user associated with a first device of the group of distributed devices has left the distributed device meeting. At operation 730, the audio channel of the first distributed device is removed from the multiple audio channels being processed by the meeting server instance.

Figure 8:
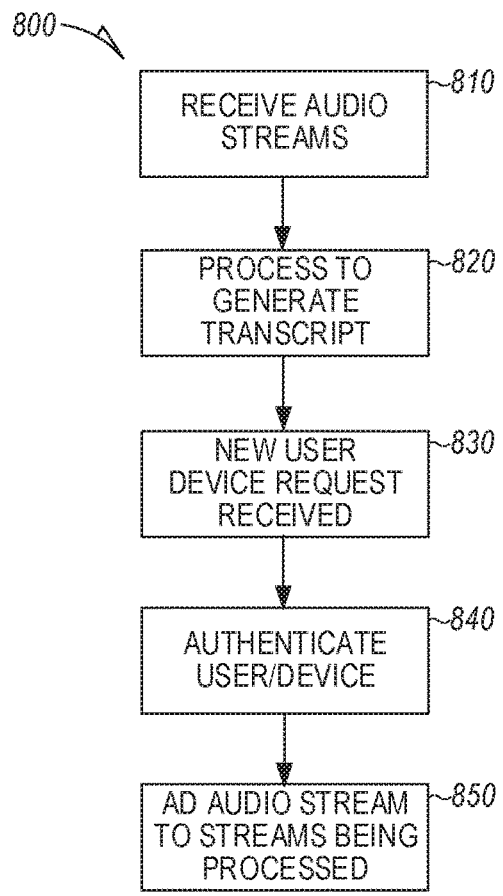
FIG. 8 is a flowchart illustrating a computer implemented method of authenticating a device for adding an audio stream from the device to audio channels being processed by a meeting server instance according to an example embodiment.

FIG. 8 is a flowchart illustrating a computer implemented method 800 of authenticating a device for adding an audio stream from the device to audio channels being processed by a meeting server instance. Method 800 begins at operation 810 by receiving audio streams at a meeting server from multiple distributed devices receiving speech from multiple users during a meeting. The received audio streams are processed at operation 820 via a meeting instance executing on the distributed device meeting server to generate a transcript based on speech included in the audio streams. At operation 830, information is received at the meeting server from a first additional distributed device associated with a first additional user, the information corresponding to the meeting between users. The information may correspond to a request to add the user's device, or may be an implied request by noting that an audio stream from such device includes a watermark or audio signature. At operation 840, the first additional distributed device or associated user is authenticated or otherwise authorized to join the meeting. The first additional distributed device has its audio stream added to the meeting instance at operation 850.

A participant may be authorized to join a meeting based on a voice fingerprint, meeting organizer acceptance, using a meeting code and/or new code, detected location of the device, comparison of the device ID and/or associated user ID to an authorized list, organization member check, use of a closed meeting flag to require acceptance by the organizer, or combinations of the above. Note that method 800 may also be applied to the first two devices to join the meeting and may also be applied to devices that are not directly associated with a user, such as a meeting assistant type of device in a conference room or video camera having a field of view of a meeting.

Remote participants may be connected into a meeting via Skype a or Teams, or telephone dial-in or any other teleconference application. If a remote conferencing platform like Skype is used, the meeting may be joined by following a link sent out ahead of time. For dial-in, a unique phone number or access code such as the meeting code may be shared. Once the remote audio channel is connected to the server for the meeting, it is processed in a way similar to audio streams from the meeting area. If the speaker ID is known based on the sign-in process, the audio stream may be a single speaker, which means that no speech separation is required unless a speakerphone is used with multiple remote users. The audio being played by the speakerphone and captured by nearby distributed devices in the meeting should be cancelled from audio streams from such nearby distributed devices.

Figure 9:
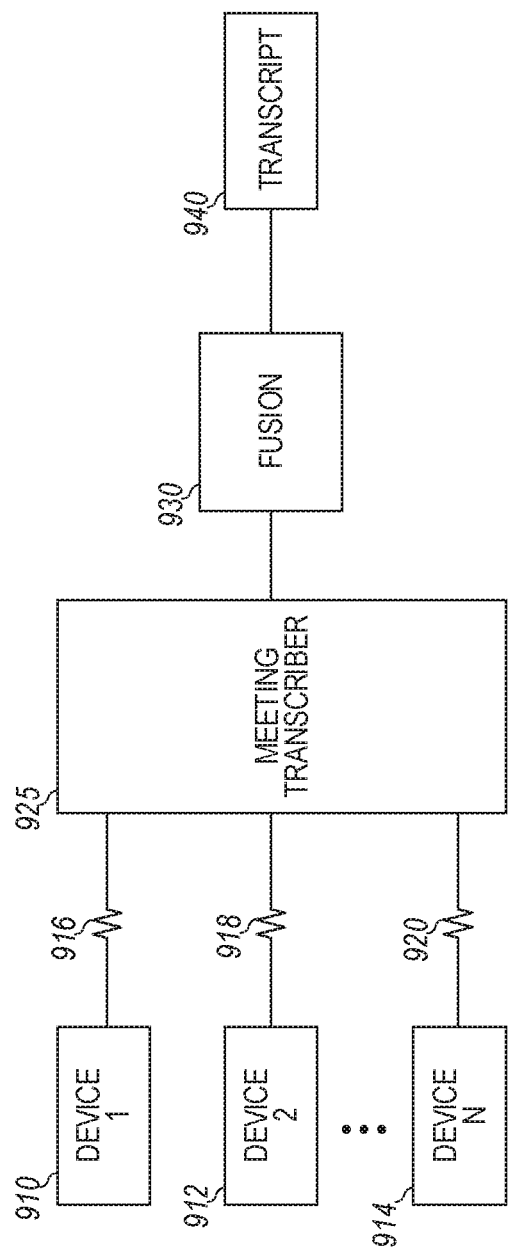
FIG. 9 is a high-level block flow diagram of a system for generating a transcript for a meeting between multiple users according to an example embodiment.

FIG. 9 is a high-level block flow diagram of a system 900 for generating a transcript for a meeting of multiple users. The users may have an associated device 910, 912, 914 that are equipped with microphones to capture audio, including speech by the various users at the meeting and provide the captured audio as audio signals to a meeting server, which includes at least a meeting transcriber 925, via audio channels 916, 918 and 920, respectively. Different devices may have slightly different clock cycles and different amounts of processing latency. In addition, each device-to-server connection channel may have a distinct latency. Thus, the signals from audio channels 916, 918 and 920 are not necessarily synchronized.

Meeting transcriber 925 may include a synchronization function in addition to a speech recognition function. The audio signals from channels 916, 918 and 920 are first synchronized and then recognized, resulting in texts associated with each of the channels in one embodiment. The recognition outputs are then fused or otherwise processed to generate a transcript 940. The transcript 940 may then be provided back to the users for viewing. In other embodiments, the audio signals from channels 916, 918, and 920 are fused before speech recognition. The audio signal obtained after the fusion is recognized, resulting in a single text for use in the transcript. In some embodiments, the transcript may be provided with very little delay.

In various embodiments, the conversion of the audio signals to text that is used in conjunction with speaker identification, and generation of a transcript that is diarized to identify speakers, are provided by meeting server 135. The functions performed by the server include the synchronization, recognition, fusion, and diarization functions. While such functions are shown in order in FIG. 9, in different embodiments, the functions may be performed in varying orders. Fusion may be performed prior to recognition and may also be performed at various other points as described below.

Figure 10:
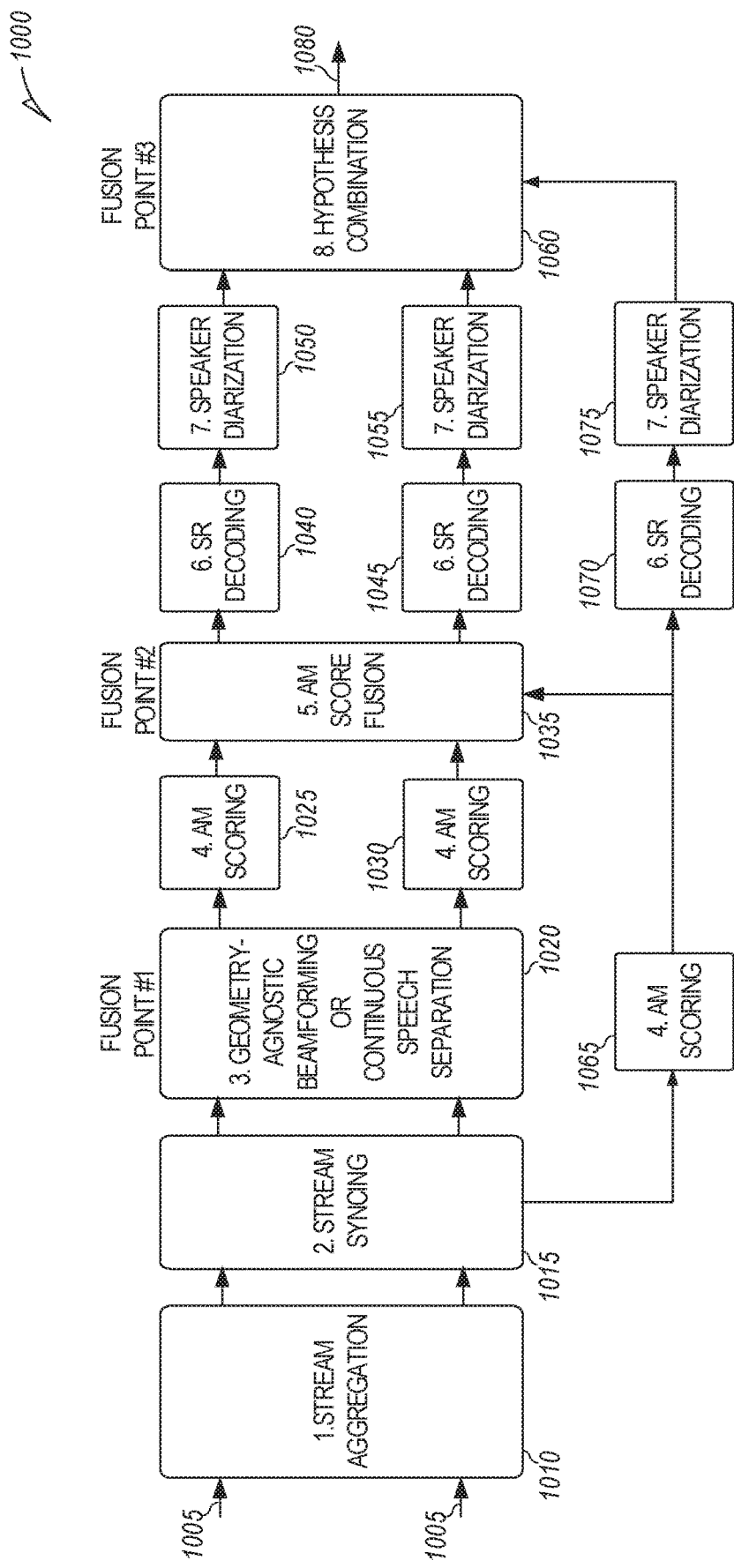
FIG. 10 is a detailed block flow diagram illustrating distributed meeting server processing of information including audio streams from distributed devices according to an example embodiment.

FIG. 10 is a detailed block flow diagram illustrating meeting server processing of information generally at 1000, including audio streams from distributed devices. Multiple audio data streams 1005 are received from multiple distributed devices. The streams include M independent sequences of data packets. Each packet of the mth sequence contains a segment of a digitized audio signal captured by the mth device. The received packets are unpacked and the data from the packets are reformed to create a multi-channel signal. The multi-channel signal may be represented as: $\{[x_0(t), \ldots, x_{M-1}(t)]; t=0, 1 \ldots\}$.

Synchronizing Audio Channels:

The digitized signals of different channels in the multi-channel signal are likely not synchronized, since many of the distributed devices are subject to digital signal processing differences, subject to on-device software latency differences, and subject to signal transmission speed differences. All of these differences can add up, making it difficult to consolidate the information from the different devices to create an accurate transcript. A stream synchronization module 1015 receives the multi-channel signal and selects one of the channels in it as a reference channel. Without loss of generality, the first channel can be used as the reference channel. For the reference channel, the output is the same as the input, i.e., $y_0(t)=x_0(t)$. For the mth channel ($0<m<M$), the amount of misalignment between $x_m(t)$ and $x_0(t)$ is estimated and corrected to generate $y_m(t)$.

The degree of misalignment can be estimated by calculating the normalized cross correlation coefficients between two signals, using a sliding window for the non-reference channel signal and picking up the lag that provides the maximum coefficient value. This can be implemented by using a buffer to temporarily store acoustic signal segments over which the cross-correlation analysis is performed individually between the reference channel and each of the other channels. Instead of the normalized cross correlation, any score function that measures the degree of alignment between the two signals can be used.

In one embodiment, the relationship between adjacent synchronization cycles is taken into account. The misalignment is caused by two factors: a device/channel-dependent offset and a device-dependent clock drift. Even when two devices are capturing an acoustic event at the same time, the signals captured by the individual devices may arrive at the server at different times, due to DSP differences, on-device software latency differences, signal transmission speed differences, and so on. This is the device/channel-dependent offset. Also, different devices inevitably have slightly different clocks due to manufacturing variability. Therefore, even if two devices claim to support, for example, a 16 kHz sampling rate, the signals recorded by these devices are not 100% aligned and the amount of mismatch linearly grows as time goes on. This is the device dependent clock drift. The device/channel-dependent offset and the device-dependent clock drift are denoted as S and D. The time difference at the kth synchronization cycle is represented as S+kD. Thus, estimates of S and D, would provide a robust estimate of the degree of misalignment, S+kD.

The amount of misalignment may be corrected by periodically detecting misalignment using the above described cross-correlation and correcting for such detected misalignment. In addition, to reduce the amount of measured misalignment, a global offset (device/channel-dependent) and device dependent clock drift may be calculated to estimate the degree of misalignment. The global offset may be used to correct global misalignment prior to measuring and correcting the misalignment by cross-correlation. The global offset may be determined as an average of measured misalignment over time and is likely the result of clock drift in the device. The degree of misalignment is thus estimated and corrected by simply accounting for the difference from the reference channel. Stream synchronization may be performed at varying intervals, such as every 30 seconds. Other intervals less than or greater than 30 seconds may be used in further embodiments, as network latencies may change.

Stream synchronization module 1015 provides a multi-channel synchronized signal, $\{[y_0(t), \ldots, y_{M-1}(t)]; t=0, 1, \ldots \}$ to a beamforming module 1020. The beamforming module 1020 functions to separate overlapping speech. Overlapping speech occurs when two people in the meeting speak at the same time. Prior to recognizing the speech and converting the speech to text, the speech is first separated into separate channels. Thus with an M-channel input, the output is N-channels, and is referred to as an N-channel beamformed signal, $\{[z_0(t), \ldots, z_{N-1}(t)]; t=0, 1, \ldots \}$. The stream synchronization module 1015 acts as a first fusion point, where multiple outputs are generated to retain the diversity of the input information. Where no speech overlaps, such fusion is optional.

Figure 11:
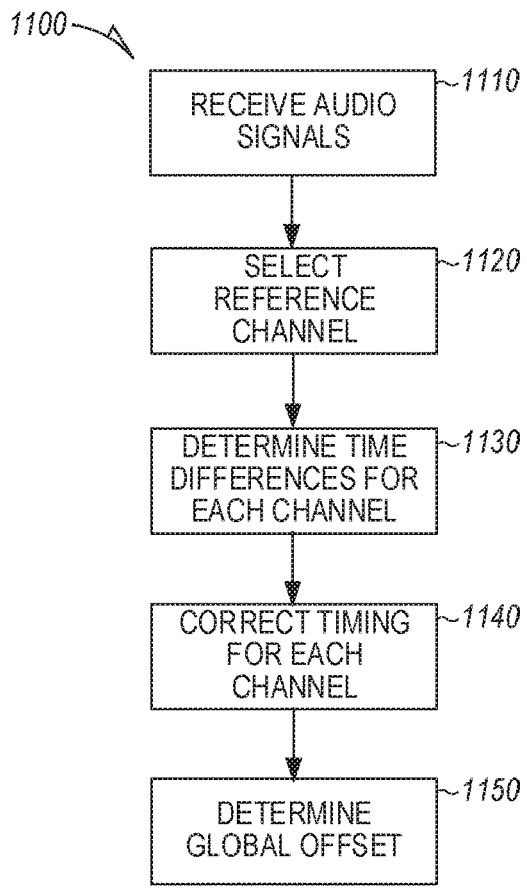
FIG. 11 is a flowchart illustrating a computer implemented method of synchronizing multiple audio channels received from multiple distributed devices during an intelligent meeting according to an example embodiment.

FIG. 11 is a flowchart illustrating a computer implemented method 1100 of synchronizing multiple audio channels received from multiple distributed devices during an intelligent meeting. At operation 1110, audio signals representative of streamed speech are received from multiple distributed devices to generate multiple audio channels. A selected one of the audio channels is designated at operation 1120 as a reference channel. Once the reference channel is designated, the following operation are performed for each of the remaining audio channels. At operation 1130, a difference in time from the reference channel is determined. Each remaining audio channel's time is aligned or compensated for by correcting the remaining audio channels with the reference channel as a function of the corresponding different in time at operation 1140. This can be done by simply dropping extraneous samples, shifting signals, appending zeros, or using resampling techniques.

Method 1100 may be performed periodically to correct the timing of the remaining audio channels, such as every 30 seconds. In one embodiment, method 1100 includes further operations to correct for the global offset caused at least by different clocks in the distributed devices. At operation 1150, a global offset is determined for each of the remaining audio channels. The remaining audio channels are then corrected at operation 1160 by each corresponding remaining audio channel global offset prior to correcting each remaining audio channel for the determined difference in time.

Geometry-Agnostic Beamforming:

Acoustic beamforming, or simply beamforming, is a technique to enhance target speech by reducing unwanted sounds such as background noise from multi-channel audio signals. It can improve the accuracy of downstream speech processing, such as speech recognition and speaker diarization.

For an intelligent meeting with audio streamed from multiple distributed devices whose exact positions relative to one another are not known, traditional beamforming algorithms, such as delay-and-sum beamforming, superdirective beamforming, and differential beamforming do not work. Such algorithms rely on prior knowledge about the arrangement of microphone devices, which is not available for distributed devices.

In one embodiment, an approach called geometry-agnostic beamforming, or blind beamforming, is used to perform beamforming for distributed recording devices. Given M microphone devices, corresponding to M audio channels, an M-dimensional spatial covariance matrices of speech and background noise are directly estimated. The matrices capture spatial statistics of the speech and the noise, respectively. To form an acoustic beam, the M-dimensional spatial covariance matrices are inverted.

A drawback of the beamforming approach, be it traditional geometry-based beamforming or blind beamforming, is that it typically reduces the number of information streams from M to one, which means the downstream modules cannot take advantage of the acoustic diversity provided by the spatially distributed devices. In order to generate M beamformed signals and retain the acoustic diversity, a leave-one-out approach can be taken. With this approach, the first output signal is generated by performing beamforming with Microphones 2-M. The second output signal is generated with Microphone 1 and 3-M. This can be repeated M times so that M different output signals are obtained. For each beamforming, (M−1)-dimensional spatial covariance matrices are computed and inverted, which is very computational demanding. Fortunately, the computational cost can be significantly reduced by deriving all the (M−1)-dimensional inverse matrices from the original M-dimensional inverse matrices.

Separating Overlapped Speech:

In some embodiments, the beamforming module 1020 may be configured to separate overlapped speech signals of different users. This could make speech recognition and speaker attribution more accurate. In one embodiment, continuous speech separation for distributed microphone recording system is performed via a neural network that is trained using permutation invariant training or its variant such as deep clustering or attractor network. To potentially save the computation, overlap detection may be used to determine whether or not the speech separation neural network should be executed for each period of time. If overlapped speech is not detected for a selected period of time, the neural network is not executed, saving processing resources and allowing the transcript to be produced more quickly in real time.

The speech separation neural network model is executed to perform continuous speech separation for distributed microphone recording system, where the number of input microphones can be arbitrary and vary through time. The neural network model is configured to receive a varying number of inputs to support a dynamic change in a number of audio signals and locations of distributed devices during a meeting between multiple users. The model outputs two continuous streams of speech. When there is one active speaker, one of the outputting streams will be silent, while when there is overlapping speech between two speakers, each speaker will occupy a distinct output stream.

The speech separation neural network model contains three submodules: the local observer, global summarizer and the mask reconstructor. The multi-channel input is processed by those three modules sequentially. Firstly, the same local observer is applied to each input microphone. The local observer consists of a set of stacked attention layer that maps each microphone input into a high dimension representation, where each channel will cross compare and extract the information from all other channels. Two different types of attention were implemented, which are the self-attention and feedforward attention.

Next, a summarizer is applied to summarize information from each observer, to form a global representation across different input channel. Two options for the summarizer are explored, which are the mean pooling and a permutation invariant sorting algorithm, where the representation of each channel is compared with permutation invariant loss to align their local permutation and the global permutation. When there is no summarization layer, the network reduced with channel wise speech separation network, where each channel has its own separation, i.e. no global separation agreement between channels.

Lastly, a mask reconstructor sorts two mask outputs at the same time for any arbitrary time. The reconstructor consists of a stack of long short-term memory networks and generates the final 2 channel output from the summarization at each time point.

After getting two channel output from the mask reconstructor, permutation invariant training objective function was applied between the reconstructed mask and the clean reference, where the Euclidean distance of each permutation pair of output and clean reference are measured first, and then minimum distance and corresponding permutation is selected to update the neural network.

The network is trained with simulated multi-channel data, where the number of input channel was randomly picked for each sample, from 2 to 10 channels. Libri speech dataset was applied as source data in the simulation. In each simulated sentence, two utterances from two random speaker firstly selected, then each utterance was processed with room acoustic simulation with room impulse responses from image method with random room and location setting. The overlap speech was generated by adding two simulated speech, with an expected overlap ratio of 50%. 1000 hours of training data was simulated. An Adam algorithm (a replacement optimization algorithm for stochastic gradient descent for training deep learning models) was applied for updating the neural network.

One variation of the speech separation is the speech overlap detection, where the task is reduced to just detect the overlap region in recorded speech. The algorithm operates in a similar way, where the network receives N channels as input, and continuously outputs 2 channels as output. In the overlap detector, the network doesn't output masks, instead, it outputs two 1 dimension indicator functions, where 1 means there is one active speaker in that channel, and 0 means silent. Therefore, when there are two active speakers, the 2-output stream will all have 1 as output. When there is one active speaker, an arbitrary channel will have 1 as output and the other will have 0. The network is also trained with a permutation invariant training objective between the output of the network, i.e. indicator function, and the reference indicator.

Figure 12:
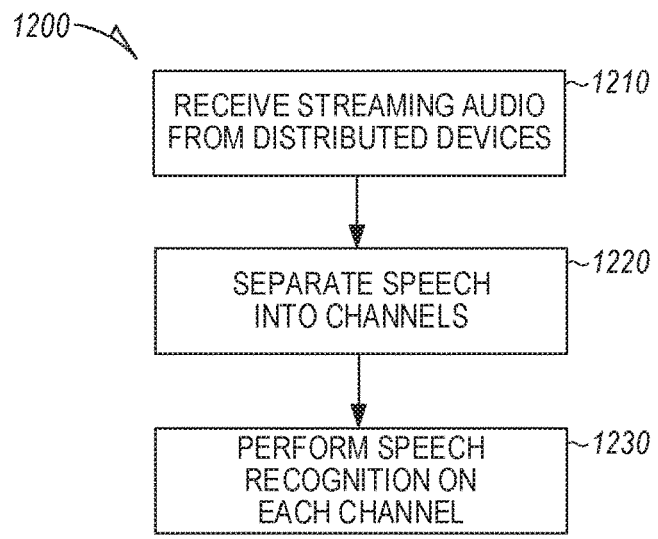
FIG. 12 is a flowchart illustrating a computer implemented method of separating overlapped speech in a distributed device intelligent meeting according to an example embodiment.

FIG. 12 is a flowchart illustrating a computer implemented method of separating overlapped speech in a distributed device intelligent meeting. At operation 1210, audio signals representative of speech is received via multiple audio channels corresponding to streaming audio transmitted from corresponding multiple distributed devices. Continuous speech separation is performed at operation 1220 on the received audio signals to separate speech from different speakers speaking at the same time into separate audio channels. At operation 1230, the separated audio channels are provided for speech recognition and generation of a transcript. Operation 1230 in one embodiment provides a fixed number of separate output channels. Since there may be a varying number of microphone inputs, and the number of outputs is fixed in advance, there may instances where a limited number of audio channels can be accommodated, since for each audio channel with multiple overlapping speakers, each speaker results in a separate audio channel. Thus, if the number of output audio channels is limited, not all channels may have speakers separated.

In one embodiment, speech separation at operation 1220 is performed by a trained neural network model. The neural network model is trained using permutation invariant training or its variant.

The N different outputs of the beamforming module 1020 in FIG. 10 are provided to N acoustic models 1025 and 1030 that produce a sequence of senone posterior probabilities. Such models are well known and are typically neural network based. The use of an acoustic model for each of multiple audio channels from distributed devices and/or beamformer outputs provides N scores for each senone.

The scores, including those for the senones, are provided to an acoustic model score fusion module 1035. The audio of the individual input channels may be processed conventionally to provide a sequence of senones and their posterior probabilities. The results are combined using the model score fusion module 1035, before applying the result to multiple speech recognition (SR) decoders 1040, 1045. Score fusion module 1035 operates as a second fusion point that combines multiple information sources and at the same time generates multiple outputs to retain the diversity of the input information. The two-step process involves two different neural nets (or classifiers): a vanilla-flavor acoustic model and a new, more targeted acoustic model. The output is a sequence of 1× the number of senones. Note that the score fusion module 1035 uses as input the output of the last layer of the acoustic model (neural net) as input. In further embodiments, the score fusion module 1035 can use the output of any layer before the last. The size of the input may be different than the size of the output.

The sequences of senones from the acoustic model score fusion module 1035 are provided to the SR decoders 1040 and 1045, each of which utilizes standard speech recognition processing to provide an n-best list of words for each segment of senones. A beginning time and a duration are provided for each word. Segmentation may be performed based on voice activity detection, speaker change detection, a fixed interval, or some other suitable method. Rescoring may be performed by using a neural network language model (NNLM) on the decoder output to generate better n-best lists of word hypotheses.

Multiple speaker diarization modules 1050, 1055 receive the outputs of the SR decoder modules as an N-best list for each segment. In one implementation, only the top word sequence hypothesis is used. A first operation extracts speaker embeddings, such as d-vectors (hidden layer activations of a deep neural network for speaker verification), at fixed intervals. A second operation factorizes the word sequence into speaker-homogeneous subsegments. This can be performed with variants of agglomerative clustering, BIC (Bayesian Information Criterion), or other methods by using the embedding features. A third operation assigns a speaker ID to each of the subsegments obtained above by comparing the proximity (e.g., cosine similarity, negative Euclidian distance) of the speaker embeddings of the subsegment and those of each candidate speaker. The resulting output is an assignment of a speaker label to each recognized word of the top SR hypothesis.

A hypothesis combination module 1060 receives as input, n-best lists from N SR decoder modules 1040, 1045 (e.g., beamformed audio channels), and speaker recognition output from N sources such as the beamformed/separated audio channels. Hypothesis combination module 1060 processes the n-best scores from each channel by scaling and normalizing them and thus computing utterance-level posterior probabilities. The n-best hypotheses are aligned into word confusion networks. By adding the utterance-level posteriors pertaining to a given word hypothesis, word-level posterior probabilities are obtained. The speaker recognition outputs from each channel are formatted as confusion networks with alternating speaker and word labels. The word labels are from the 1-best recognition hypotheses, whereas the speaker labels represent 1-best or n-best speaker model matching to the speech segments. Posterior probabilities for the speaker hypotheses represent normalized speaker model likelihoods. Posteriors on word hypotheses are scaled down by two orders of magnitude to not affect the final word recognition, thus affecting only the proper alignment of word and speaker labels. The confusion networks thus obtained from each channel are truncated and/or concatenated as necessary, to cover the same time window, as dictated by online processing constraints. The output comprises a confusion network (CN) encoding both word and speaker hypotheses and their posterior probabilities.

The word and speaker confusion networks are aligned according to a minimum edit distance criterion, as well as a penalty for time discrepancies between aligned nodes. This effectively merges the speaker and word hypotheses into a single network, summing the posteriors of matching labels. If desired, the top speaker and word hypotheses are read off from the combined CN by picking the highest-posterior label at each position. The word confusion networks may be built from word lattices instead of n-best lists, depending on what the speech decoder outputs.

The output from combination module 1060 is the result of a third fusion, referred to as a late fusion, to produce text and speaker identification for generation of a speaker-attributed transcript of the meeting. Note that the first two fusion steps at beamforming module 1020 and acoustic model score fusion module 1035, respectively, are optional in various embodiments. In some embodiments, one or more audio channels may be provided directly to an acoustic model scoring module 1065 without beamforming or speech separation. Speech recognition is then performed on such one or more audio channels via SR decoder 1070, followed by speaker diarization module 1075, with the output provided directly to combination module 1060.

Audio streams may be fused early, following synchronization of digital audio streams, by geometry-agnostic beam forming or continuous speech separation. Multiple outputs may be generated to retain input information diversity. Late fusing may be done at an acoustic model score level and/or text level/diarization level to leverage speaker information and diverse model hypotheses. In one embodiment, late fusion over a word or two is performed by use of a fixed time window. The time window in one embodiment corresponds to salient audio events, and may be fixed at, for example, 2 seconds. Such a time window is selected to be fairly short to enable the provision of real-time transcripts with low latency.

Late fusion of data is performed by speech recognition for multiple audio channels being processed in parallel, to produce phrases. The phrases derived from the multiple audio channels are combined in real time. In one embodiment, approximately two seconds of speech is combined at hypothesis combination module 1060. Thus, the audio streams are processed as they are received. A non-overlapping sliding window of two seconds is used to process the audio streams, decreasing the latency of the meeting server 135 transcript generation to close to zero.

The individual speech recognition decoders continuously output some results and based on the hypothesis combination module 1060, the results are processed immediately. A special provision is provided for the alignment of the individual systems at stream synchronization module 1015, otherwise the final results may contain multiple instances of the same events (due to misalignment). A post-processing step removes any duplicates that may exist regardless of the signal and/or speech recognition output alignment. Alignment may be performed on either the word level or on the sample level of the signals. Note also that different versions of audio are received by the speech recognition decoders. Each SR decoder may have heard something different. By combining the SR results (late fusion) with low latency, a highly accurate transcript is produced. Every SR outputs a word or two with a confidence level. The time, such as two seconds, is long enough to obtain some salient output, in other words, an output having a word or two that can be recognized with some confidence. A fixed window of time, such as two seconds was found to work better. If the time is too short, there is no salient event, and if the time is too long, latency becomes too long, and the transcript is delayed, making the transcript of less utility during a meeting.

Another version of this approach is to wait for time points in the audio stream where either (1) all streams contain no speech with high confidence or (2) have a single word hypothesis with high confidence. In those places the hypothesis space can be pinched to a single hypothesis, which makes it possible to perform combination without loss of accuracy as a result of incorrect word segmentation.

The transcript may be provided to one or more of the meeting participants as based on the output indicated at 1080. A single meeting transcript is provided based on the output of the meeting system. The transcript is composed of individual utterances and associated media, such as slides or photos of drawings. Each utterance is assigned a universal timestamp, attributed speaker, associated text, and an associated audio segment, where the audio is extracted from the synchronized input streams from all participating clients.

Additional media such as images, notes, and other abstract objects can be associated to the transcript inline through a timestamp (e.g. a picture of a whiteboard was captured and uploaded at time t) or to the whole meeting without a specific timestamp (e.g. a file was uploaded after the meeting and associated with this meeting instance). All attendees can have access to the meeting and associated data Ad-hoc meetings can be viewed and modified by meeting owner, all attendees, or anyone depending on the permissions set by the entity that created the meeting. Additional services such as meeting summarization, action item identification, and topic modeling may be provided using the transcript and other associated meeting data.

Multilevel Fusion

Figure 13:
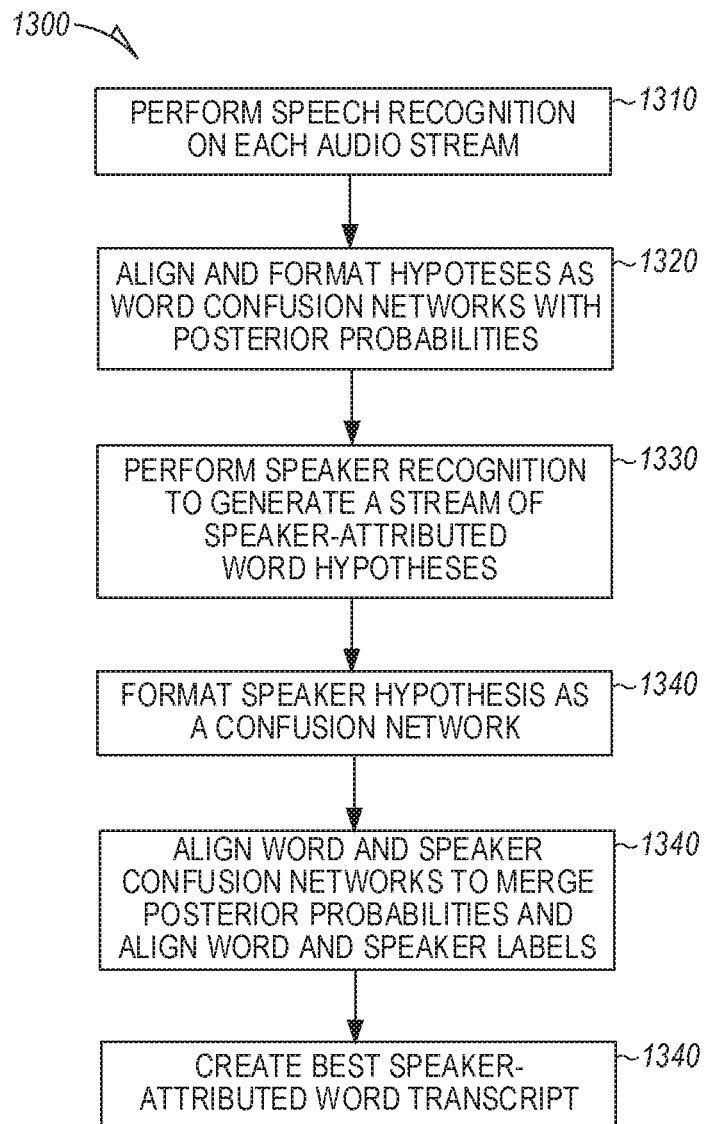
FIG. 13 is a flowchart illustrating a computer implemented method 13 of fusing audio streams at multiple selected points during processing according to an example embodiment.

FIG. 13 is a flowchart illustrating a computer implemented method 13 of fusing audio streams at multiple selected points during processing. The audio streams are recorded during a meeting by a plurality of distributed devices. Method 13 is performed by one or more processors performing operations. An operation 1310 performs speech recognition on each audio stream by a corresponding speech recognition system executing on the one or more processors to generate utterance-level posterior probabilities as hypotheses for each audio stream. The hypotheses are aligned and formatted at operation 1320 as word confusion networks with associated word-level posterior probabilities. Operation 1330 performs speaker recognition on each audio stream by execution of a speaker identification algorithm that generates a stream of speaker-attributed word hypotheses. The speaker hypotheses are formatted with associated posterior speaker label posterior probabilities and speaker-attributed hypotheses for each audio stream as a confusion network at operation 1340. Operation 1350 aligns the word and speaker confusion networks from all audio streams to each other to merge the posterior probabilities and align word and speaker labels. A best speaker-attributed word transcript is created at operation 1360 by reading off or selecting the sequence of word and speaker labels with the highest posterior probabilities.

In one embodiment, a special approximate version is obtained when only a single word hypothesis from each stream is generated, possibly even without posterior probabilities, and where simple voting among all streams is used.

Method 1300 operations may be performed on successive time windows applied to the audio streams such that the processing is performed incrementally so as to enable production of speaker-attributed word recognition hypotheses in real-time. The input hypotheses are truncated in time to a common time window applied to all audio streams based on the time marks associated with the word hypotheses generated for each audio stream.

The input speaker and/or word hypotheses streams may originate from multiple partial combination of input audio streams via fusion of K out of N, where K<N, audio streams. Alternatively, the input speaker and/or word hypotheses streams originate not from different audio streams, but from multiple partial combination of acoustic models applied to K out of N audio streams, which in turn could result from raw audio signals or fusion of audio signals.

In yet a further embodiment, the input hypotheses are truncated in time to a common time window applied to all audio streams based on the time marks associated with the word hypotheses generated for each audio stream. The combination of K out of N raw audio signals or fusion of the audio signals may be based on audio-quality criteria and/or based on the relative position of the speakers with respect to the distributed devices.

In one embodiment, the input speaker and/or word hypotheses streams originate from multiple partial combination of input audio streams via fusion of K out of N audio streams, where K<N. The combination of K out of N acoustic model outputs may be based on audio-quality criteria of the input signals and/or based on the relative position of the speakers with respect to the distributed devices. Alternatively, the input speaker and/or word hypotheses streams may originate from multiple partial combinations of acoustic models applied to K out of N audio streams where K<N, which in turn result from raw audio streams or fusion of audio streams. In yet a further embodiment, the output of multiple acoustic models may be applied to K out of N audio streams, where K<N, which in turn result from raw audio streams or fusion of audio streams that are combined as input to M speech recognition decoders.

Figure 14:
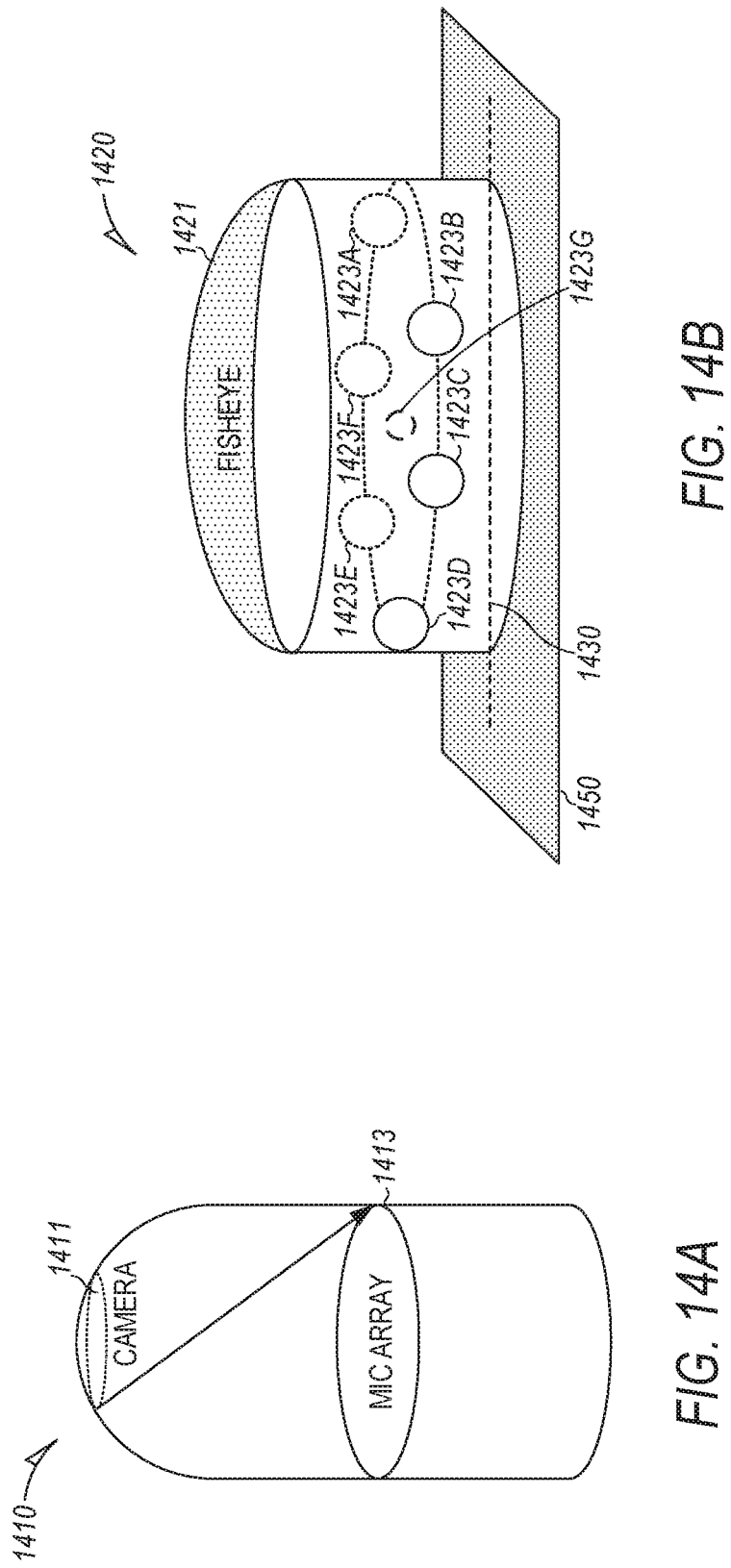
FIGS. 14A and 14B illustrate an example ambient capture device according to an example embodiment.

Reducing Computational Resources in an Ambient Capture Device:

FIGS. 14A and 14B illustrate an example ambient capture device 1410. In an embodiment, ambient capture device 1410 may be cylindrical in shape with a fisheye camera 1411 at the top of and facing up with respect to the device. A microphone array 1413 may be coupled to the device 1410 below the camera 1411 and placed around the cylinder to capture audio in 360°. It should be noted that the device in FIG. 14A may not be drawn to scale. To capture optimal 360° vision (e.g., video or still images), it may be desirable for the fisheye camera to be close to a floor or table surface 1450. In an embodiment, the device may be short and squat to avoid blind spots below the camera 1411. In an embodiment, the fisheye camera may be placed in close proximity to a microphone array 1413. In the example illustrated in FIG. 14B, seven microphones 1423A-G are included in the microphone array 1413. As shown, six microphones 1423A-F may be placed around the device in a plane and more or less equidistant from the center of the device, and a seventh microphone 1423G may be placed in the center. It will be understood that the device may be made of audio penetrable material, such as a light fabric, grille, or mesh, and that the microphones 1423 are not blocked by the fisheye camera 1421 or other structural portions of the device 1420, so that the sound is not obstructed.

In an embodiment, the fisheye camera may be approximately 30 cm from the base of the device 1420, and the microphone array 1413 may be affixed approximately 15 cm above the base 1430. When in operation, the device 1420 may sit on, or be affixed to, the floor or table 1450 in an environment. As the device 1420 is placed closer to the floor, the 360° horizontal field of view (HFOV) may include more of the environment. The fisheye camera 1421 is typically affixed to the device 1420 facing up, so the ceiling may be in the field of view. It will be understood that other shapes, sizes or configurations of the device 1420 and placement of the fisheye camera 1421 and microphone array 1423 may be implemented, with some adaptation to provide both similar and varying results.

In an embodiment, acoustic parameters for audio capture may vary depending on the specifications of the microphones. An example of acoustic specifications for an embodiment are shown below in Table 1. In an embodiment, the acoustic parameters may apply to the whole audio subsystem, e.g., captured pulse code modulation (PCM) data, not just the microphones. The captured audio may produce adequate speech recognition accuracy for use in an AI application. One of ordinary skill in the art, with the benefit of the present disclosure, will appreciate that various acoustic parameters may be utilized to achieve speech recognition accuracy, and that the example parameters in Table 1 are for illustrative purposes.

TABLE 1

Example Acoustic Parameters

| | |
|---|---|
| Sensitivity (1 kHz 94dB SPL) | −26 +/− ≤0.1. dB FS |
| Signal-noise ratio (SNR), including power supply and digital filter noise | ≥64 dB A |
| Frequency Response | 50 −> 16 kHz (+/−≤3 dB) |
| Total Harmonic Distortion | ≤1% (105 dB SPL) ≤5% (115 dB SPL) |
| Directionality | Omnidirectional (≤1 dB sensitivity difference for 50 −> 16 kHz) |
| Variance between microphones | ≤1 dB sensitivity difference for 50 −> 16 kHz |
| Longevity | No permanent loss of performance at: Maximum SPL ≥160 dB Maximum shock ≥10,000 g Temperature Range −40° C. to +80° C. |

Figure 15:
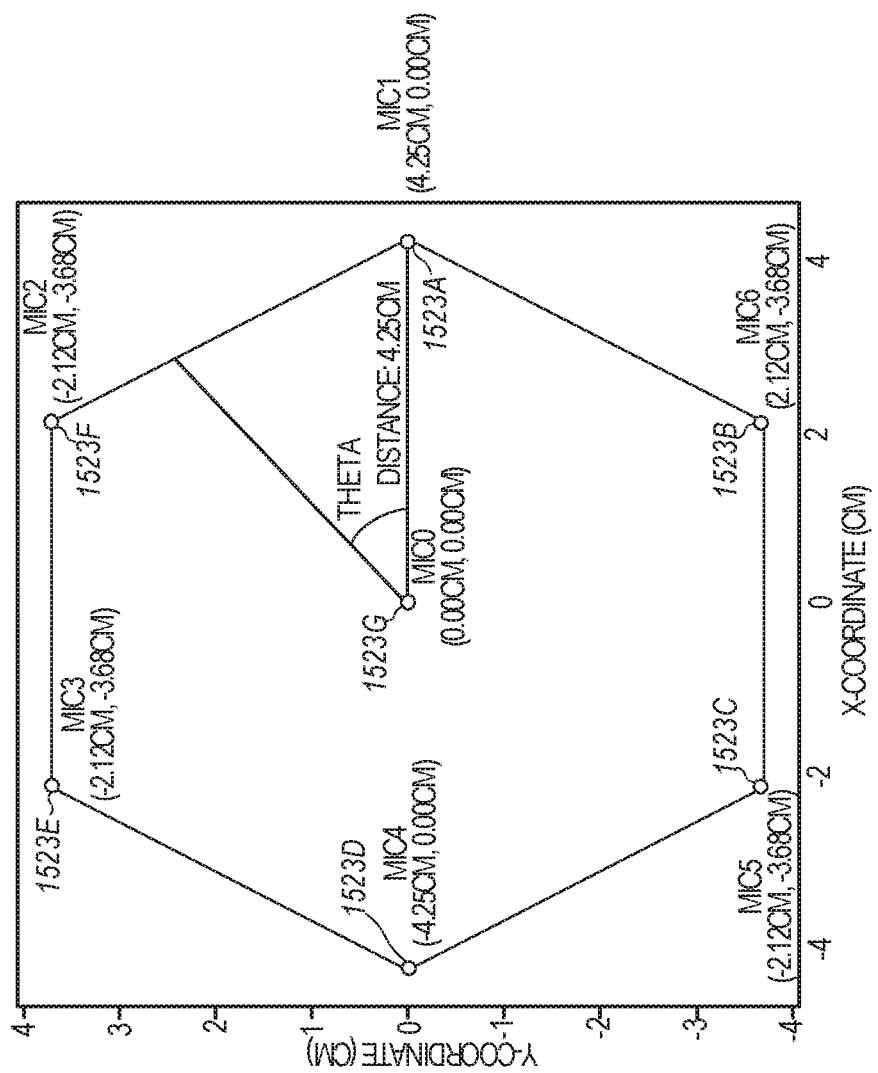
FIG. 15 illustrates an example placement of the microphone array according to an example embodiment.

FIG. 15 illustrates an example placement of the microphone array 1523, according to an embodiment. In an embodiment, the device includes seven microphones placed in the same plane. Six microphones 15 23A-F may be placed in a circular or hexagonal pattern in the plane, approximately 4.25 cm from a center point. A seventh microphone 15 23G may be placed at the center point. In an embodiment, the configuration of seven microphones comprise microphones of similar specification. It will be understood that additional processing of the audio data received from the microphone array may be necessary to normalize or adjust the audio when the microphones are dissimilar. In an example implementation, the microphone array 15 23 may comprise seven digital microelectromechanical systems (MEMS) microphones with ports facing upwards. It will be understood that better performance may result when the microphones are not obstructed by sound absorbing or blocking components, such as a circuit board or device case. In an embodiment, similar microphones are clocked using the same clock source in the device (not shown). The clocking or timestamping of the audio may assist with synchronization and fusion of the audiovisual data. The ambient capture device may decimate all microphone signals to 16-bit 16 kHz PCM data. In this context, decimation is the process of reducing the sampling rate of the signal. For automatic speech recognition, frequency bands higher than 8 kHz may be unnecessary. Therefore, a sampling rate of 16 kHz may be adequate. Decimation reduces bit rate without compromising required accuracy. In an embodiment, the capture device may support additional bit depths and sampling frequencies. In an embodiment, the capture device may not allow changing data width and sampling frequency, to reduce driver complexity and improve stability. The microphones may be mounted using any adequate mechanical dampening mechanism, for instance, rubber gaskets, to reduce vibrations and noise. It will be understood that more or fewer microphones may be present in the microphone array. However, fewer microphones may introduce some uncertainty of speaker location or direction. Additional microphones may provide increased certainty or resolution of the audio, but at a cost of more hardware and additional complexity of calculation.

In an embodiment, an audio speaker may be located at the bottom, or base, of the device, for audio feedback to the user. The audio speaker may be used for feedback announcements or be an integral part of the AI application. For instance, in an AI application for conference management, a user may request meeting minutes to be read back to the attendees. An integrated speaker in the device may provide feedback or request instructions or commands for operation. If a spoken command is not understood, a request to repeat the command may be played through the speaker. To reduce acoustic feedback, the audio speaker may face the opposite direction from the microphone array. Audio played back via the audio speaker may be looped back as an additional synchronized microphone channel.

Referring back to FIG. 14B, in an embodiment, the fisheye camera 1421 may receive 360° HFOV, and at least 95° vertical field of view (VFOV) above, and 95° VFOV below a horizontal axis, resulting in a 190° VFOV, or approximately 200° diagonal field of view (DFOV). In practice, the capture device may be placed on a table of floor, so a vertical view below the surface may not be needed. Thus, in discussion herein, the VFOV is identified as approximately 95° to indicate a view above the horizontal base plane of the device. In an embodiment, the fisheye camera 1421 may include one fisheye sensor of 12 megapixels (MP) (e.g., providing a 4K resolution). The camera lens may be mounted with respect to its image sensor, so that the optical center aligns with the center of the image sensor, and the optical axis is perpendicular to the image sensor. The relative position of the camera module to the microphone array may be fixed and known. In particular, the optical center may also align with the center of the microphone array, with the optical axis perpendicular to the microphone array.

Figure 16:
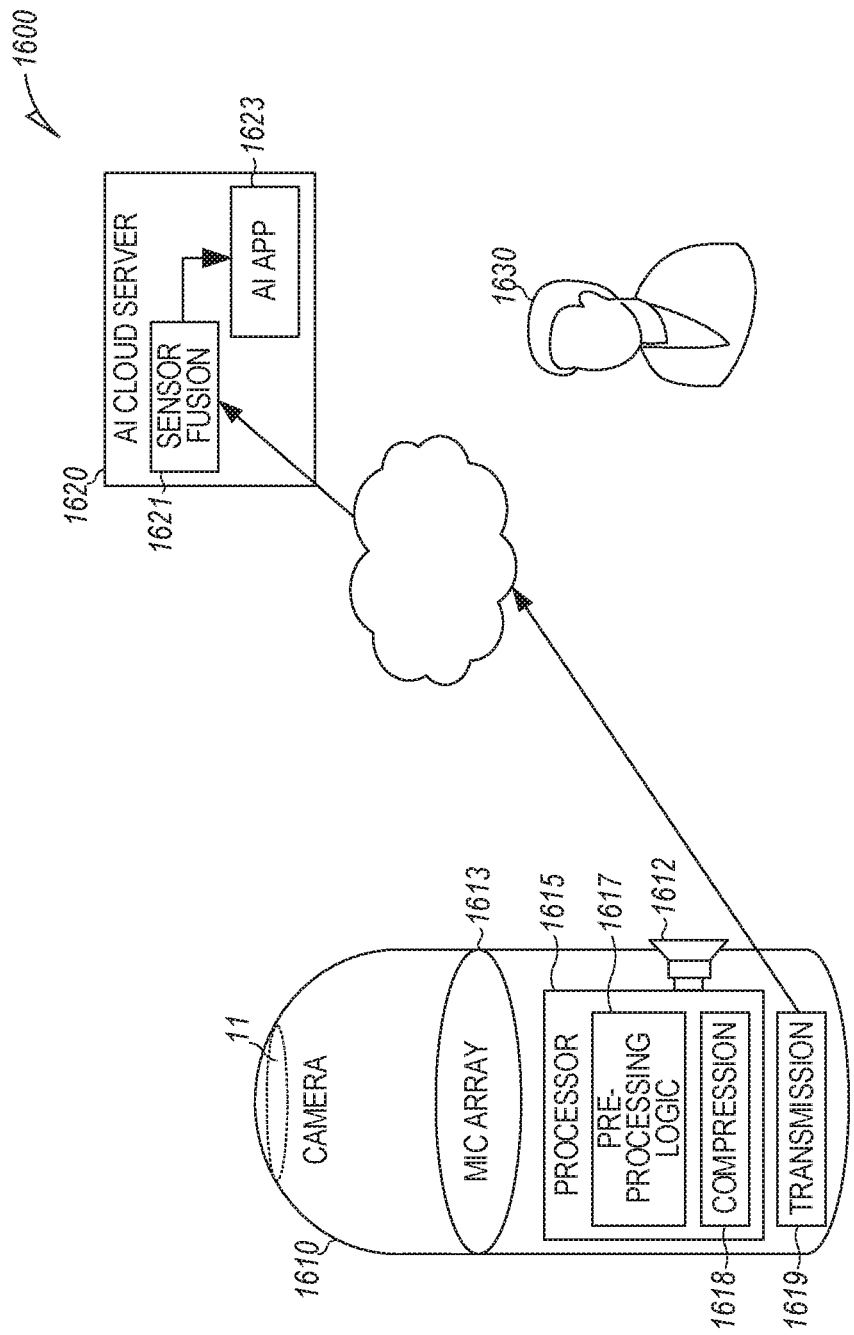
FIG. 16 illustrates an AI system with an ambient capture device according to an example embodiment.

FIG. 16 illustrates an AI system 1600 with an ambient capture device 1610, as described above, and a meeting server, referred to as a cloud server 1620. In an example, user 1630 interacts with an AI application 1623. It will be understood that the AI application may reside on the cloud server 1620 or on a local device (not shown). Audiovisual data may be captured in 360° by the AI capture device 1610. As discussed above, the capture device 1610 may include a fisheye camera 1611 providing a 3600 HFOV and approximately a 95° VFOV. The capture device 1610 may include a microphone array 1613 to capture audio in 360°. Video compression of the images and video stream received by the camera 1611 may be performed by a processor 1615 on the device. Video modes and compression protocols and criteria may be controlled by user selectable software controls. In addition to compression, the audiovisual data may be protected by encryption, to prevent unauthorized persons from obtaining the data. In an embodiment, compression 1618 may be performed by circuitry on the device and controlled by software switches. Pre-processing 1617 (e.g., cropping of images based on image content, or noise reduction) may be performed by logic executed by the processor, before compression 1618. In an embodiment, pre-processing may include acoustic echo cancellation (AEC) to reduce feedback, noise, and echo caused by a speaker 1612 coupled to the device. In an embodiment, a local process for keyword spotting (KWS) may be included in order to listen for device commands for the ambient capture device, such as to wake or turn off the device. The local KWS may favor recall vs. precision, and it may be based on a reduced microphone array (e.g., two microphones rather than the full array). When AEC is performed on the device 1610, the acoustic channel including the speaker audio may not need to be sent to the models to perform sensor fusion 1621. The compressed audiovisual data may be sent to a cloud server 1620 by a transmission unit 1619. Transmission unit 1619 may include one or more of: a network interface card for wired communication, such as an Ethernet connection: a wireless transceiver using a wireless protocol such as for WiFi®, Bluetooth®, NFC: or other communication means. In an embodiment, audio feedback may be sent to the device via one of the wireless channels. The cloud server 1620 may perform sensor fusion 1621 for the AI application 1623. Therefore, compression may be performed to reduce bandwidth of the transmission to the cloud via a transmission unit 1619.

Capture device 1410 may be used with distributed devices in capturing audio and video from a distributed device meeting. Device 1410 may itself be one of the distributed devices. The identification of users associated with speech may be performed solely by capture device 1410 in one embodiment, of the information streams collected from capture device 1410 may be used together with information streams collected from the other distributed devices to generate speaker attributed transcripts in various embodiments.

Figure 17:
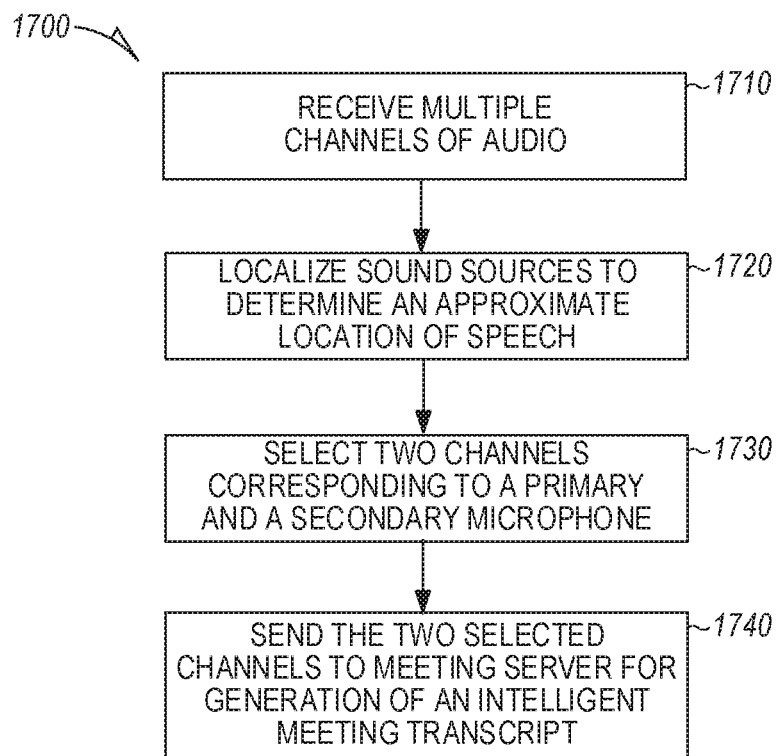
FIG. 17 is a flowchart illustrating a computer implemented method of reducing the number of audio streams sent over a network to the meeting server for use in generating a transcript according to an example embodiment.

FIG. 17 is a flowchart illustrating a computer implemented method 1700 of reducing the number of audio streams sent over a network to the meeting server for use in generating a transcript. Method 1700 begins by receiving multiple channels of audio at operation 1710 from three or more microphones detecting speech from a meeting of multiple users. At operation 1720, directions of active speakers are estimated. A speech unmixing model is used to select two channels that may correspond to a primary and a secondary microphone at operation 1730, or may correspond to a fused audio channel. The two selected channels are sent at operation 1740 to a meeting server for generation of an intelligent meeting transcript. By reducing the amount of data sent to the meeting server, bandwidth is conserved. Since the data selected is arguably the best data, little if any accuracy is lost.

In one embodiment, the microphones are supported by a device in a fixed configuration. The fixed configuration may include a camera having a field of view configured to include the multiple users. Localizing sound sources may be performed by executing a model trained on channels of audio and video from the camera. For example, if one user is using a laptop computer with a camera, the laptop may provide both an audio and video channel. The audio channel may be synchronized with respect to the reference audio channel, and the same time difference may be used to synchronize the video channel. Image recognition may be used on the video channel to identify the user as the speaker for diarization in producing the transcript. In a further embodiment, the laptop computer may perform image processing to determine that the user is speaking and provide a tag on the audio channel identifying the user as the speaker and indicating whether the user is speaking or not speaking. The tag may then be used for diarization without the need to transmit the video channel from the laptop.

In a further embodiment, the microphones are associated with multiple distributed devices. The distributed devices may include wireless devices respectively associated with the multiple users. At least one of the distributed devices may include a camera providing video of at least one of the users.

In yet a further embodiment, the microphones include microphones supported in a fixed configuration and microphones associated with distributed devices associated with users. The method may be performed by one or more of a device supporting the microphones in a fixed position or an edge device receiving the multiple channels of audio. The speech unmixing model may be executed on the edge device.

In further embodiments, client-side processing (processing on one or more of the distributed devices, ambient capture device, and/or edge server) is used to reduce the computational resources required by the meeting server as well to reduce the amount of network bandwidth utilized for processing distributed meeting information streams from the distributed devices. In addition to the reduction in the number of streams sent via network to the meeting server as described above, beamforming may be performed on the client side, as well as generation of audio watermarks and meeting codes. In further embodiments, model sizes may be reduced and quantized to better run on the client side. The objective function may also be modified to better run on the client size. Instead of outputting a speech mask, sound source localization may be used with commensurate less computations.

Both audio and video channels may be used to attribute speech to users for creation of the diarized transcript. An audiovisual diarization approach allows the combining of voice identification, sound source localization, face tracking/identification, and visual active speaker detection from distributed sensors to achieve robust diarization.

Figure 18:
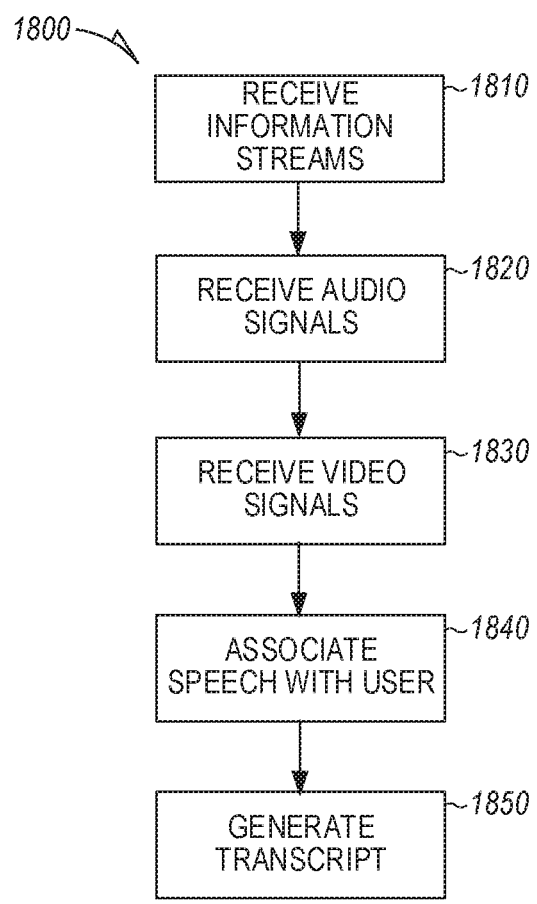
FIG. 18 is a flowchart illustrating a computer implemented method for using both video and audio channels, audiovisual data, from distributed devices to provide better speaker identification according to an example embodiment.

FIG. 18 is a flowchart illustrating a computer implemented method 1800 for using both video and audio channels, audiovisual data, from distributed devices to provide better speaker identification. Method 1800 begins by receiving, at operation 1810, information streams on a meeting server from a set of multiple distributed devices included in an intelligent meeting. At operation 1820, audio signals representative of speech by at least two users in at least two of the information streams are received. At operation 1830, at least one video signal of at least one user in the information streams is received. The received audio and video signals are used to associate speech in the received audio signals with a specific user as a function of the received audio and video signals at operation 1840. A transcript of the intelligent meeting is generated at operation 1850 with an indication of the user associated with the speech.

The multiple distributed devices in one embodiment are mobile wireless devices associated with users in the intelligent meeting. The mobile wireless devices may include a microphone, and also may include a camera that provides the at least one video signal. In further embodiments, the multiple distributed devices include a device having multiple microphones supported in a fixed configuration, each microphone providing one of the received audio signals. The device may include a camera having a field of view configured to include multiple users in the intelligent meeting and provide the at least one video signal.

In one embodiment, a fusion model is used on the received audio and video signals to associate the specific user with the speech. In an embodiment, the audiovisual data may be analyzed by the meeting server. The audiovisual data may be first be compressed prior to sending to the meeting server via a network. In another embodiment, the fusion model be coupled to the capture device as an integrated system. Discussions herein describe the meeting server for illustration purposes and not as a limitation.

The meeting server decompresses, decodes or decrypts the data, as necessary. The audiovisual data may be fused and analyzed by an AI application utilizing an LSTM model, for example, to identify or infer features in the audiovisual data such as, but not limited to: audio direction; speaker location in an image; speaker movement; voice signature; facial signature; gesture; and/or object. In an example, an AI application may require speech recognition or facial recognition. The LSTM model(s) may be trained with data specific to the AI application using the sensor data. In an embodiment, more than one model or analysis engine may be used, as discussed above.

In an embodiment, speech may be identified and gesture recognition using the video data may be performed. The LSTM model may use the identified speech and the recognized gesture to provide a probable fusion of the data, and send the probable outcomes to the AI application. In an example, a gesture combined with a voice command may provide specific control commands to the AI application. In an example, analysis of video data may indicate an eye gaze or track eye movements to infer where a user is looking. Eye gaze analysis may result in control commands for the AI application, and may differ based on fusion with audio data. In an embodiment, the LSTM model may be trained for a specific AI application and provide the control or commands for that application, based on the fused data. In another embodiment, the LSTM model may be more generic, and provide probable correlated data, such as audio streams for each speaker with a speaker ID and location in the environment, and a video stream, to the AI application for further processing and interpretation of the inputs. In this example, the AI application may use the audio and video stream input to derive the appropriate commands or perform actions.

One embodiment utilizes a fisheye camera with a 12 MP sensor. Another embodiment may include an infrared (IR) or other depth sensor to provide three dimensional (3D) or depth information. Depth information may not be available in 360° if there are not enough depth sensors to cover the entire HFOV. Variations of the capture device may be provided to accommodate various price points acceptable to a wide range of users, or for different applications. For instance, inclusion of the depth sensors or higher resolution sensors may increase the cost or complexity of the device beyond what is necessary for the selected AI application.

Figure 19:
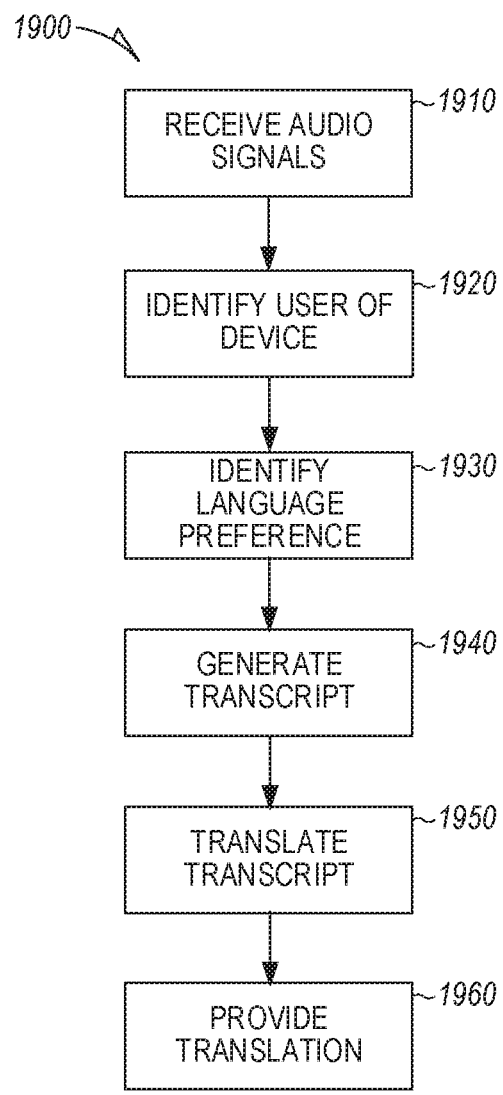
FIG. 19 is a flowchart illustrating a computer-implemented method for customizing output based on a user preference according to an example embodiment.

FIG. 19 is a flowchart illustrating a computer-implemented method 1900 for customizing output based on a user preference according to an example embodiment. Operations in the method 1900 are performed by the meeting server or system (e.g., meeting server 135), using components described above. Accordingly, the method 1900 is described by way of example with reference to the meeting server. However, it shall be appreciated that at least some of the operations of the method 1900 may be deployed on various other hardware configurations or be performed by similar components residing elsewhere in a network environment. Therefore, the method 1900 is not intended to be limited to the meeting server.

In operation 1910, the meeting server receives audio streams from a plurality of distributed devices. In example embodiments, the audio streams comprise speech captured by one or more of the plurality of distributed devices during a meeting of two or more users. In some embodiments, the meeting is an ad-hoc meeting. In these embodiments, the server can perform blind beamforming or continuous speech separation on the received audio streams to separate speech from background noise or different speakers speaking at the same time into separate audio channels. In some cases, the audio streams are compared to determine that the audio streams represent sound from the (same) ad-hoc meeting. A meeting instance is then generated to process the audio streams identified as being from the ad-hoc meeting.

In operation 1920, an identity of a user of one of the distributed devices is identified by the meeting server. In one embodiment, the user is identified based on a video signal captured by a camera (e.g., camera 155, camera 1521) associated with the meeting. The video signal is transmitted to the meeting server. The meeting server compares an image of the user from the video signal with stored images of known (e.g., registered) users to determine a match. If a stored image matches a captured image of the user in the video signal, then the user is identified. In one embodiment, the image of the user is stored or associated with a user profile of the user.

In an alternative embodiment, the user is identified based on a voice signature. In this embodiment, speech from the audio stream is parsed or diarized and compared to stored voice signatures of known users. If a stored voice signature matches the parsed/diarized speech from the audio stream, then the user is identified. In one embodiment, the voice signature of the user is stored or associated with a user profile of the user.

In operation 1930, a language preference of the identified user is determined. In some embodiments, a user profile of the identified user that is accessed. The user profile comprises at least a predetermined preference for a language of the user. In some cases, the predetermined preference is established (e.g., explicitly indicated) by the user. In other cases, the predetermined preference is determined based on a device configuration of the device (e.g., distributed device such as a cellphone or laptop) associated with the user. For example, the device may be configured to function in English or Chinese.

In operation 1940, the meeting server generates a transcript as discussed above. In example embodiments, speech from the audio streams are converted to text in order to generate a text-based transcript or digital transcript. In one embodiment, as discussed above, a real-time transcript is generated based on short word sequences. Late fusion of data may be performed by speech recognition for multiple audio channels being processed in parallel to produce phrases. The phrases derived from the multiple audio channels are combined in real-time or near real-time. In one embodiment, approximately two seconds of speech is combined. As a result, the audio streams are essentially processed as they are received. A non-overlapping sliding window of a few seconds, such as two seconds, is used to process the audio streams, decreasing latency for transcript generation.

In operation 1950, the meeting server translates the transcript according to the language preference of the user. In some embodiments, the meeting server takes the generated transcript from operation 1940) and translates the text in the generated transcript into text in the preferred language. In other embodiments, the meeting server takes the generated transcript from operation 1940 and converts the generated transcript into speech in the preferred language. Further still, some embodiments may perform both text translation and speech translation.

In operation 1960, the translated transcript is provided to a device (e.g., distributed device) of the user. In some embodiments, the device comprises a same device that is used to capture audio from the user. The translated transcript can provided, for example, as a text displayed on a display device (e.g., screen) of the device, or as a speech audio via speaker devices (e.g., earpieces, hearing aids or loudspeakers) by using text-to-speech. In some embodiments, the diarization results may also be provided.

While the method 1900 of FIG. 19 is described having operations in a particular order, alternative embodiments may perform the method 1900 with operations in a different order. For example, identifying the user (operation 1920) and determining the language preference (operation 1930)

can occur after or while the transcript is generated (operation 1940) and prior to translating the transcript (operation 1950).

Figure 20:
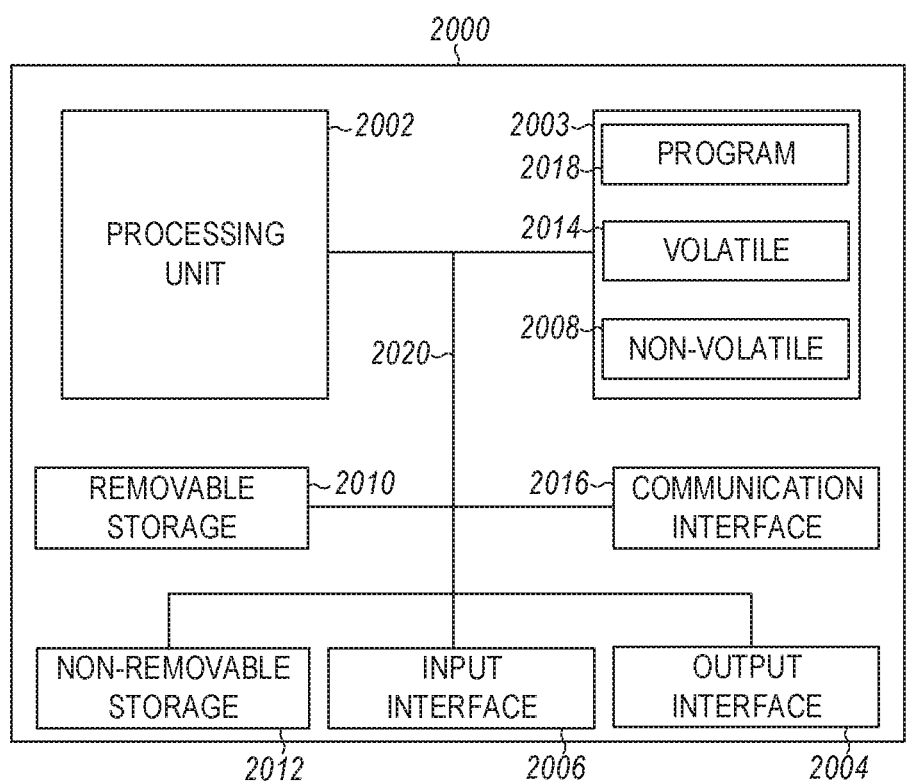
FIG. 20 is a block schematic diagram of a computer system to implement one or more example embodiments.

FIG. 20 is a block schematic diagram of a computer system 2000 to implement and manage the handling of intelligent meetings via multiple distributed devices, edge devices, and cloud based devices and for performing methods and algorithms according to example embodiments. All components need not be used in various embodiments.

One example computing device in the form of a computer 2000 may include a processing unit 2002, memory 2003, removable storage 2010, and non-removable storage 2012. Although the example computing device is illustrated and described as computer 2000, the computing device may be in different forms in different embodiments. For example, the distributed devices may be a smartphone, a tablet, smartwatch, or other computing device including the same or similar elements as illustrated and described with regard to FIG. 20. Devices, such as smartphones, tablets, and smartwatches, are generally collectively referred to as mobile devices, distributed devices, or user equipment.

Although the various data storage elements are illustrated as part of the computer 2000, the storage may also or alternatively include cloud-based storage accessible via a network, such as the Internet, server-based storage, or a smart storage device (SSD). Note also that an SSD may include a processor on which the parser may be run, allowing transfer of parsed, filtered data through I/O channels between the SSD and main memory.

Memory 2003 may include volatile memory 2014 and non-volatile memory 2008. Computer 2000 may include— or have access to a computing environment that includes—a variety of computer-readable media, such as volatile memory 2014 and non-volatile memory 2008, removable storage 2010 and non-removable storage 2012. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 2000 may include or have access to a computing environment that includes input interface 2006, output interface 2004, and a communication interface 2016. Output interface 2004 may include a display device, such as a touchscreen, that also may serve as an input device. The input interface 2006 may include one or more of a touchscreen, touchpad, mouse, keyboard, camera, one or more device-specific buttons, one or more sensors integrated within or coupled via wired or wireless data connections to the computer 2000, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 2000 are connected with a system bus 2020.

Computer-readable instructions stored on a computer-readable medium are executable by the processing unit 2002 of the computer 2000, such as a program 2018. The program 2018 in some embodiments comprises software to implement one or more methods for implementing the meeting app and meeting server, as well as the modules, methods, and algorithms described herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 2018 along with the workspace manager 2022 may be used to cause processing unit 2002 to perform one or more methods or algorithms described herein.

EXAMPLES

1. A computer implemented method includes receiving audio signals representative of speech via multiple audio channels transmitted from corresponding multiple distributed devices, designating one of the audio channels as a reference channel, and for each of the remaining audio channels, determine a difference in time from the reference channel, and correcting each remaining audio channel by compensating for the corresponding difference in time from the reference channel.

2. The method of example 1 wherein correcting each remaining audio channel is performed by dropping extraneous samples or using resampling.

3. The method of any of the above examples wherein correcting each remaining audio channel is performed at regular time intervals.

4. The method of any of the above examples and further including determining a global offset for each of the remaining audio channels and correcting the remaining audio channels by each corresponding remaining audio channel global offset prior to correcting each remaining audio channel for the determined difference in time.

5. The method of any of the above examples and further comprising generating an output signal of corrected audio channels, the output signal comprising an M channel synchronized signal, $\{[(y_0(t), \ldots, y_{M-1}(t)]; t=0, 1, \ldots\}$, wherein M is the number of audio channels, t is time, y represents the signals on each channel, and $y0(t)$ is the reference channel audio signal.

6. The method of any of the above examples wherein the received audio signals comprise audio streams from the distributed devices received as M sequences of data packets, wherein each packet of the mth sequence contains a segment of digitized audio signal captured by the mth distributed device.

7. The method of any of the above examples wherein the distributed devices comprise user devices associated with users in an ad-hoc meeting.

8. The method of any of the above examples wherein one of the distributed devices comprises an ambient capture device having an array of microphones in fixed positions.

9. A machine-readable storage device has instructions for execution by a processor of a machine to cause the processor to perform operations to perform a method. The operations include receiving audio signals representative of speech via multiple audio channels transmitted from corresponding multiple distributed devices, designating one of the audio channels as a reference channel, and for each of the remaining audio channels, determine a difference in time from the reference channel, and correcting each remaining audio channel by compensating for the corresponding difference in time from the reference channel.

10. The device of example 9 wherein correcting each remaining audio channel is performed periodically.

11. The device of any of the above examples wherein the operations further include determining a global offset for each of the remaining audio channels and correcting the remaining audio channels by each corresponding remaining audio channel global offset prior to correcting each remaining audio channel for the determined difference in time.

12. The device of any of the above examples wherein the operations further include generating an output signal of corrected audio channels, the output signal comprising an M channel synchronized signal, $\{[y_0(t), \ldots y_{M-1}(t)], t=0, 1, \ldots\}$, wherein M is the number of audio channels, t is time, y represents the signals on each channel, and y0(t) is the reference channel audio signal.

13. The device of any of the above examples wherein the received audio signals comprise audio streams from the distributed devices received as M sequences of data packets, wherein each packet of the mth sequence contains a segment of digitized audio signal captured by the mth distributed device.

14. The device of any of the above examples wherein the distributed devices include user devices associated with users in an ad-hoc meeting.

15. The device of any of the above examples wherein one of the distributed devices comprises an ambient capture device having an array of microphones in fixed positions.

16. A device includes a processor and a memory device coupled to the processor and having a program stored thereon for execution by the processor to perform operations. The operations include receiving audio signals representative of speech via multiple audio channels transmitted from corresponding multiple distributed devices, designating one of the audio channels as a reference channel, and for each of the remaining audio channels, determine a difference in time from the reference channel, and correcting each remaining audio channel by compensating for the corresponding difference in time from the reference channel.

17. The device of example 16 wherein the operations further include determining a global offset for each of the remaining audio channels and correcting the remaining audio channels by each corresponding remaining audio channel global offset prior to correcting each remaining audio channel for the determined difference in time.

18. The device of any of the above examples wherein the operations further comprise generating an output signal of corrected audio channels, the output signal comprising an M channel synchronized signal, $\{[y_0(t), \ldots, y_{M-1}(t)]; t=0, 1, \ldots\}$, wherein M is the number of audio channels, t is time, y represents the signals on each channel, and y0(t) is the reference channel audio signal.

19. The device of any of the above examples wherein the received audio signals comprise audio streams from the distributed devices received as M sequences of data packets, wherein each packet of the mth sequence contains a segment of digitized audio signal captured by the mth distributed device.

20. The device of any of the above examples wherein the distributed devices comprise user devices associated with users in an ad-hoc meeting.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
    receiving audio signals representative of speech via multiple audio channels transmitted from corresponding multiple distributed devices;
    designating one of the audio channels as a reference channel; and
    for each of the remaining audio channels:
    determining a difference in time from the reference channel;
    correcting each remaining audio channel by compensating for the corresponding time difference from the reference channel such that the multiple audio channels are synchronized; and
    providing the synchronized audio channels to respective acoustic models to produce senone posterior probabilities.

2. The method of claim 1 wherein the difference in time from the reference channel is estimated by calculating normalized cross correlation coefficients between two signals, using a sliding window for the non-reference channel signal and picking up a lag that provides a maximum coefficient value and wherein correcting each remaining audio channel is performed by dropping extraneous samples or using resampling.

3. The method of claim 1 wherein correcting each remaining audio channel is performed at regular time intervals.

4. The method of claim 1 and further comprising:
    determining a global offset for each of the remaining audio channels; and
    correcting the remaining audio channels by each corresponding remaining audio channel global offset prior to correcting each remaining audio channel for the determined difference in time.

5. The method of claim 1 and further comprising generating an output signal of corrected audio channels, the output signal comprising an M channel synchronized signal, $\{[y_0(t), \ldots, y_{M-1}(t)]; t=0, 1, \ldots\}$, wherein M is the number of audio channels, t is time, y represents the signals on each channel, and y0(t) is the reference channel audio signal.

6. The method of claim 1 wherein the received audio signals comprise audio streams from the distributed devices received as M sequences of data packets, wherein each packet of the mth sequence contains a segment of digitized audio signal captured by the mth distributed device.

7. The method of claim 1 wherein the distributed devices comprise user devices associated with users in an ad-hoc meeting.

8. The method of claim 1 wherein at least one of the distributed devices comprises an ambient capture device having an array of microphones in fixed positions.

9. A machine-readable storage device having instructions for execution by a processor of a machine to cause the processor to perform operations to perform a method, the operations comprising:
    receiving audio signals representative of speech via multiple audio channels transmitted from corresponding multiple distributed devices;
    designating one of the audio channels as a reference channel; and for each of the remaining audio channels:
  determine a difference in time from the reference channel;
  correcting each remaining audio channel by compensating for the corresponding time difference from the reference channel such that the multiple audio channels are synchronized; and
  providing the synchronized audio channels to respective acoustic models to produce senone posterior probabilities.

10. The device of claim 9 wherein correcting each remaining audio channel is performed periodically.

11. The device of claim 9 and further comprising:
  determining a global offset for each of the remaining audio channels; and
  correcting the remaining audio channels by each corresponding remaining audio channel global offset prior to correcting each remaining audio channel for the determined difference in time.

12. The device of claim 9 and further comprising generating an output signal of corrected audio channels, the output signal comprising an M channel synchronized signal, $\{[y_0(t), \ldots, y_{M-1}(t)]; t=0, 1, \ldots\}$, wherein M is the number of audio channels, t is time, y represents the signals on each channel, and y0(t) is the reference channel audio signal.

13. The device of claim 9 wherein the received audio signals comprise audio streams from the distributed devices received as M sequences of data packets, wherein each packet of the mth sequence contains a segment of digitized audio signal captured by the mth distributed device.

14. The device of claim 9 wherein the distributed devices comprise user devices associated with users in an ad-hoc meeting.

15. The device of claim 9 wherein one of the distributed devices comprises an ambient capture device having an array of microphones in fixed positions.

16. A device comprising:
  a processor; and
  a memory device coupled to the processor and having a program stored thereon for execution by the processor to perform operations comprising:
    receiving audio signals representative of speech via multiple audio channels transmitted from corresponding multiple distributed devices;
    designating one of the audio channels as a reference channel; and
    for each of the remaining audio channels:
    determine a difference in time from the reference channel;
    correct each remaining audio channel by compensating for the corresponding time difference from the reference channel such that the multiple audio channels are synchronized; and
    provide the synchronized audio channels to respective acoustic models to produce senone posterior probabilities.

17. The device of claim 16 wherein the operations further comprise:
  determining a global offset for each of the remaining audio channels; and
  correcting the remaining audio channels by each corresponding remaining audio channel global offset prior to correcting each remaining audio channel for the determined difference in time.

18. The device of claim 16 wherein the operations further comprise generating an output signal of corrected audio channels, the output signal comprising an M channel synchronized signal, $\{[y_0(t), \ldots, y_{M-1}(t)]; t=0, 1, \ldots\}$, wherein M is the number of audio channels, t is time, y represents the signals on each channel, and y0(t) is the reference channel audio signal.

19. The device of claim 16 wherein the received audio signals comprise audio streams from the distributed devices received as M sequences of data packets, wherein each packet of the mth sequence contains a segment of digitized audio signal captured by the mth distributed device.

20. The device of claim 16 wherein the distributed devices comprise user devices associated with users in an ad-hoc meeting.

* * * * *